United States Patent
Meyer et al.

(10) Patent No.: US 8,636,379 B2
(45) Date of Patent: Jan. 28, 2014

(54) WARNING LIGHT ASSEMBLY; COMPONENTS; AND, METHODS

(75) Inventors: Charles Meyer, New Lenox, IL (US); Dennis Hilburger, Crown Point, IN (US); Myron Pavlacka, Frankfort, IL (US); Robert Czajkowski, Tinley Park, IL (US); Paul Gergets, St. John, IN (US); Jacek Jozwik, Mokena, IL (US)

(73) Assignee: Federal Signal Corporation, Oak Brook, IL (US)

( * ) Notice: Subject to any disclaimer, the term of this patent is extended or adjusted under 35 U.S.C. 154(b) by 153 days.

(21) Appl. No.: 13/027,418

(22) Filed: Feb. 15, 2011

(65) Prior Publication Data

US 2012/0026718 A1    Feb. 2, 2012

Related U.S. Application Data

(60) Provisional application No. 61/306,258, filed on Feb. 19, 2010.

(51) Int. Cl.
*F21V 7/00*    (2006.01)

(52) U.S. Cl.
USPC ...... 362/241; 362/249.02; 362/540; 362/542; 362/545

(58) Field of Classification Search
USPC ......... 362/241, 245, 247, 287, 493, 512, 513, 362/545, 540, 542; 340/815.45, 815.73, 340/815.75, 815.76
See application file for complete search history.

(56) References Cited

U.S. PATENT DOCUMENTS

| | | | |
|---|---|---|---|
| RE36,245 E | 7/1999 | Stanuch et al. | |
| 6,100,791 A | 8/2000 | Bader et al. | |
| 6,461,008 B1 | 10/2002 | Pederson | |
| 7,425,078 B2 * | 9/2008 | Wilkinson et al. | 362/35 |
| 7,819,538 B2 * | 10/2010 | Nobayashi et al. | 362/35 |
| 7,963,683 B2 * | 6/2011 | Czajkowski et al. | 362/517 |
| 2007/0263376 A1 | 11/2007 | Wilkinson et al. | |
| 2008/0049439 A1 | 2/2008 | Wang | |
| 2008/0074279 A1 * | 3/2008 | Chiu et al. | 340/815.45 |

FOREIGN PATENT DOCUMENTS

EP    2 199 661 A2    6/2010

OTHER PUBLICATIONS

International Search Report and Written Opinion mailed May 23, 2011.

* cited by examiner

*Primary Examiner* — Robert May
(74) *Attorney, Agent, or Firm* — Merchant & Gould P.C.

(57) ABSTRACT

A warning light assembly, components therefor and methods of assembly and use are described. The warning light assembly includes a moveable reflector light pod arrangement comprising at least one moveable reflector light pod having a selectively moveable reflector arrangement and a plurality of LED units configured and oriented to direct light against a selectively moveable reflector arrangement. A variety of specific, preferred, features are shown and described.

19 Claims, 19 Drawing Sheets

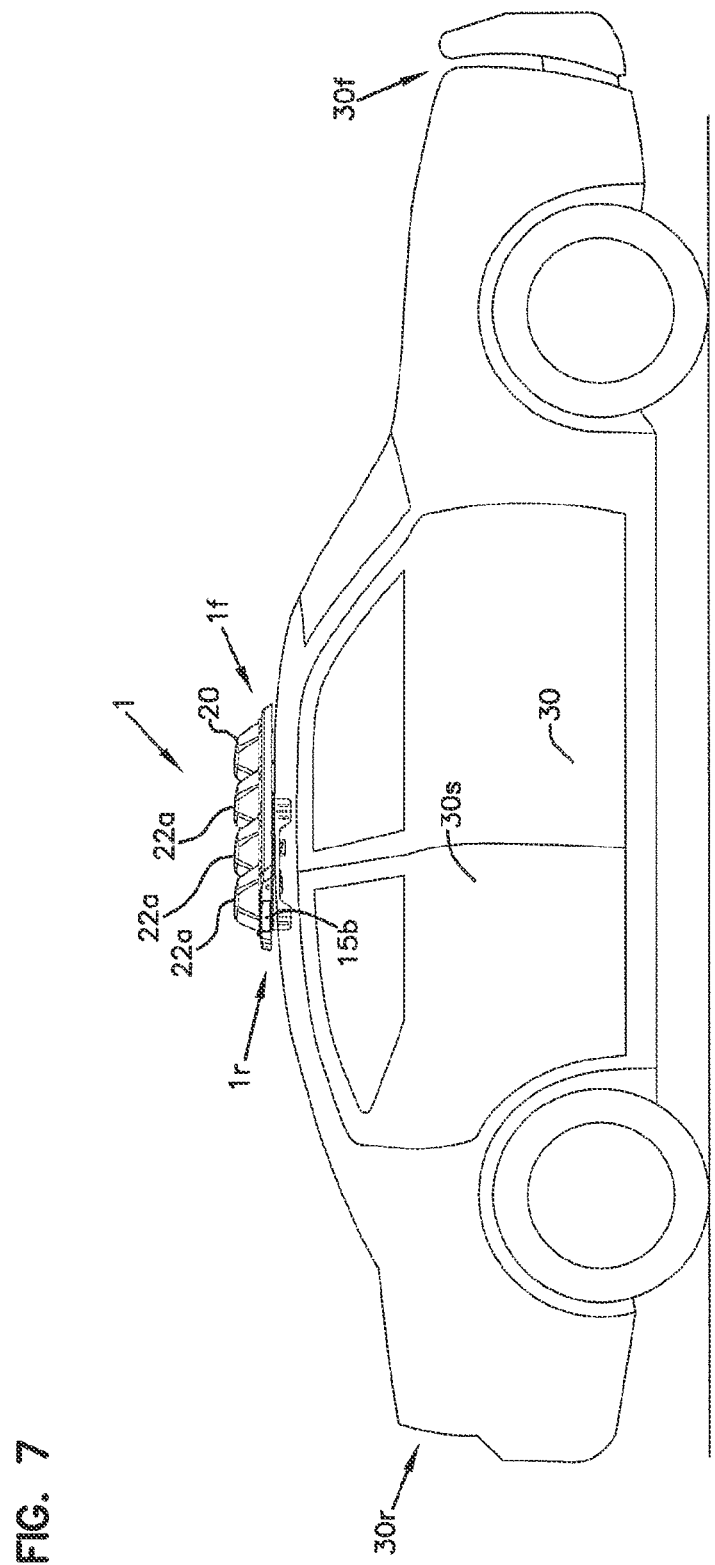

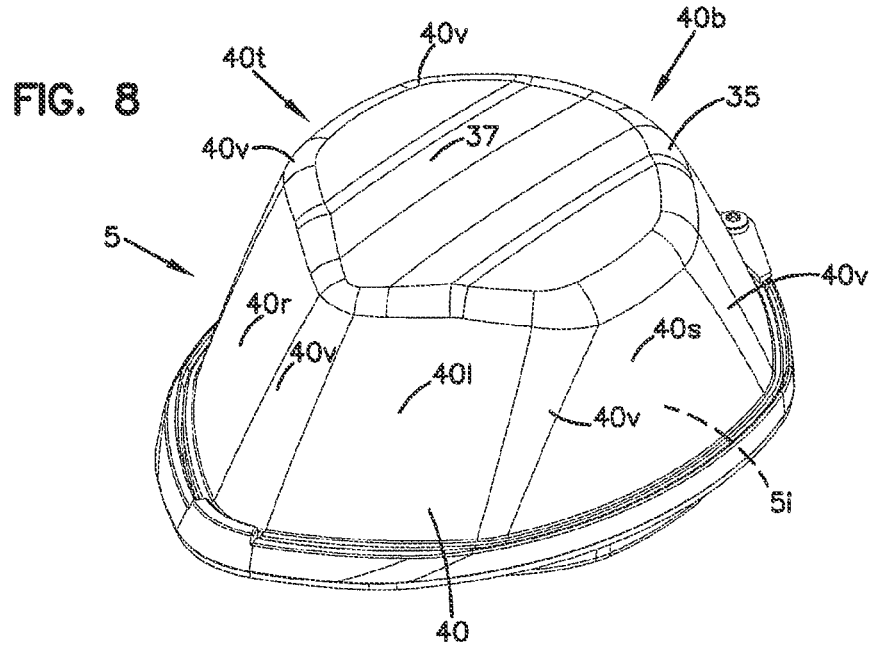
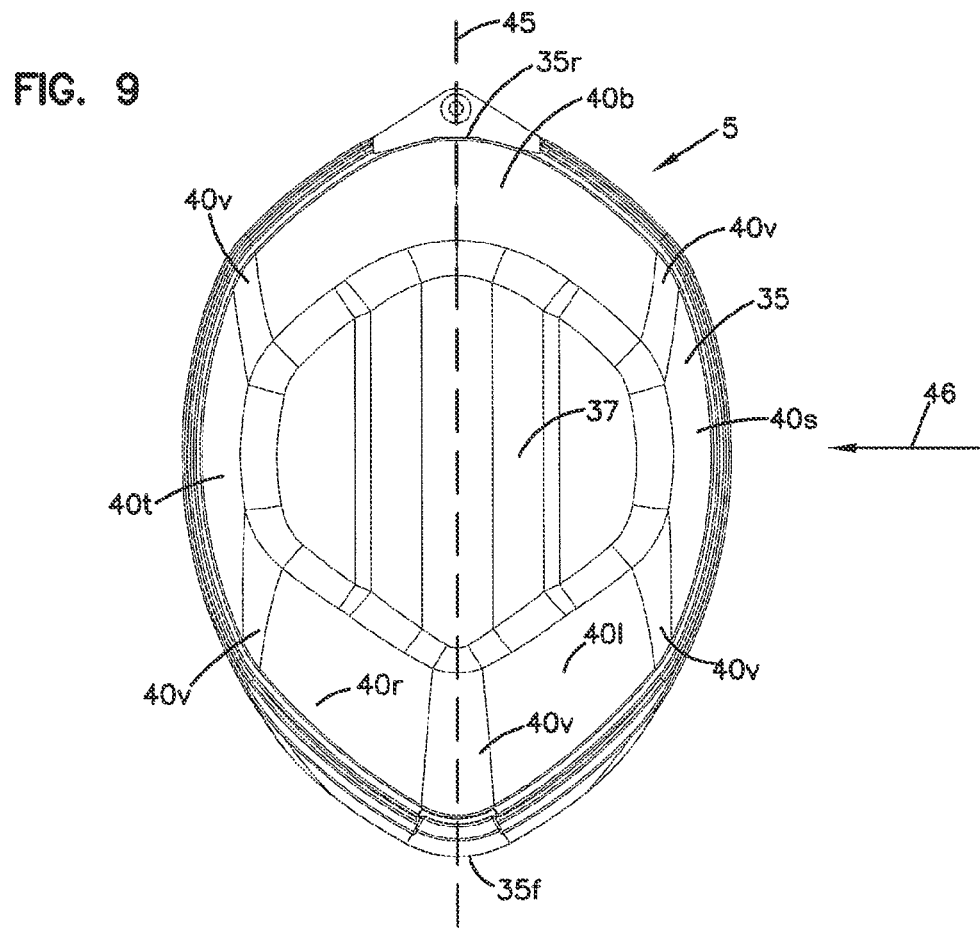

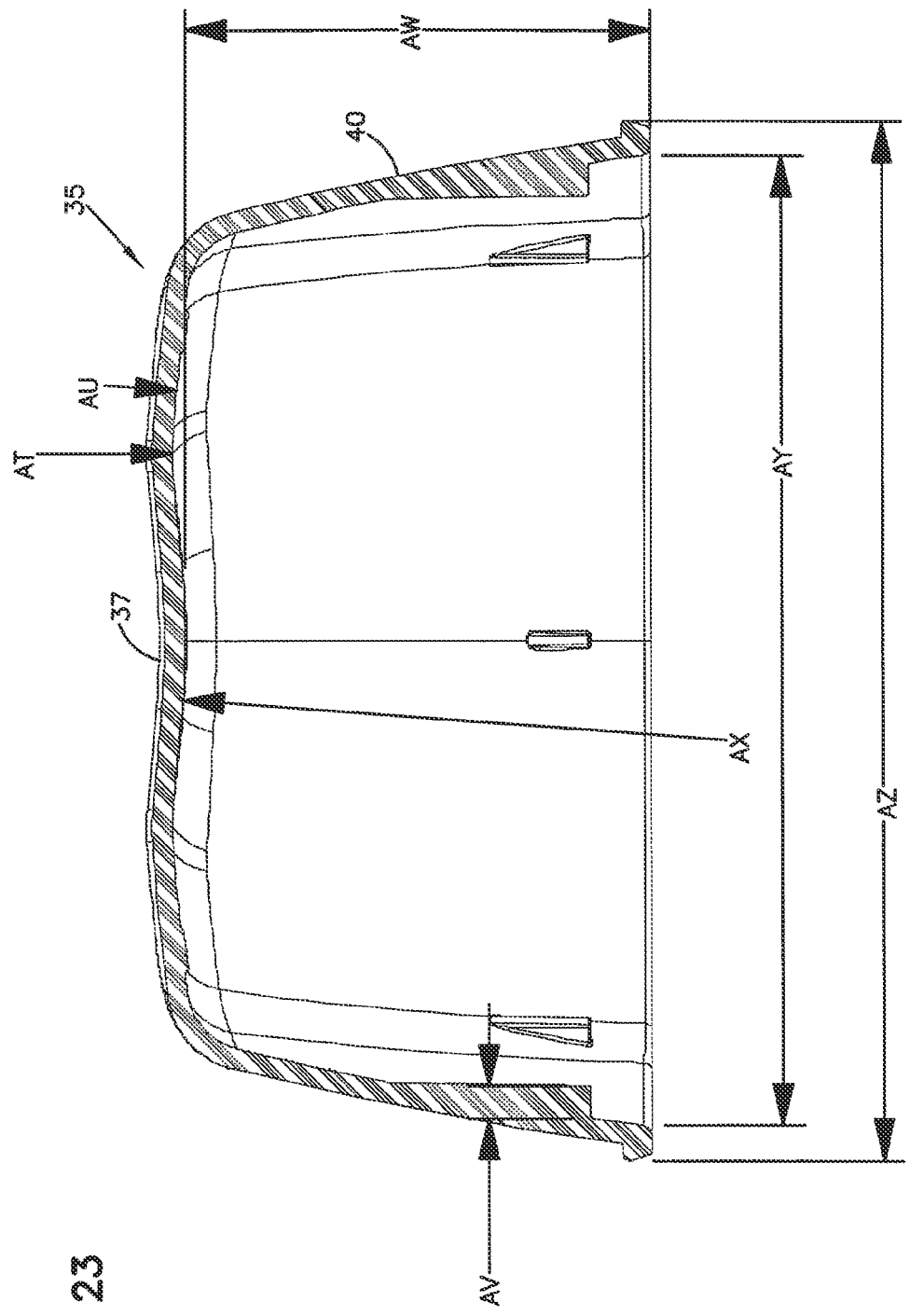

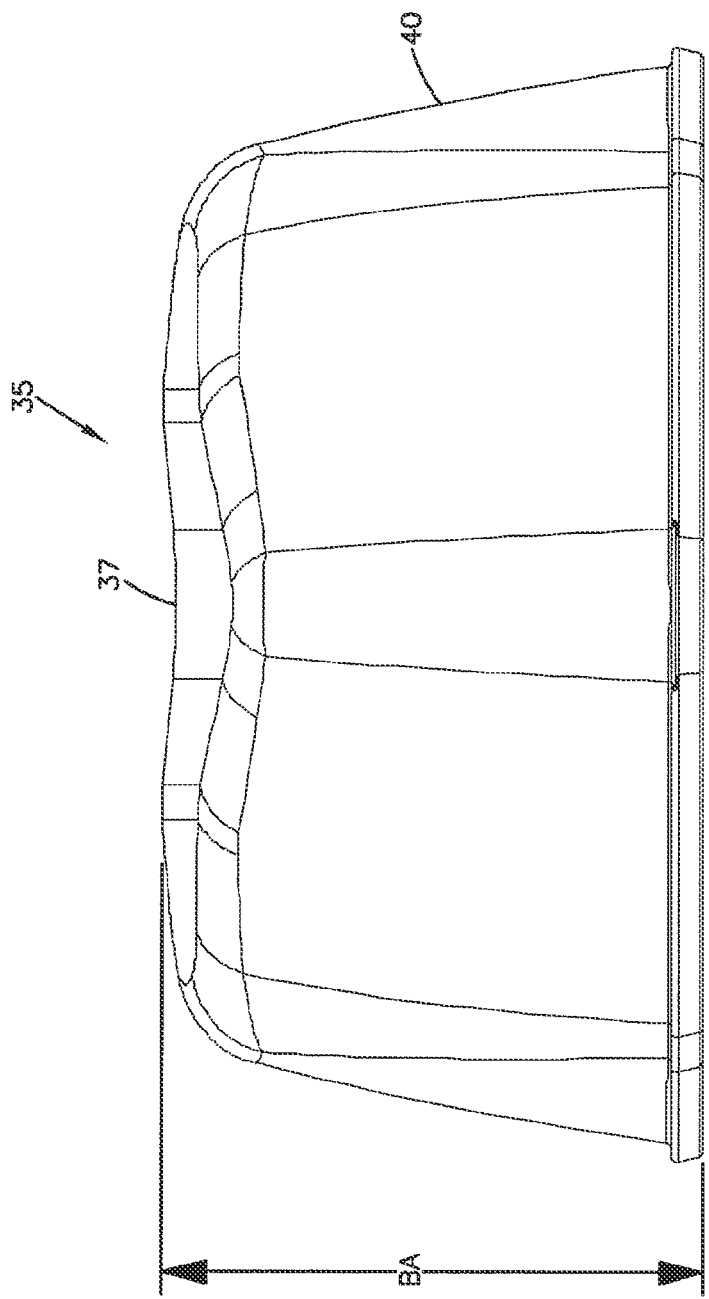

WARNING LIGHT ASSEMBLY; COMPONENTS; AND, METHODS

CROSS REFERENCE TO RELATED APPLICATION

The present application includes the disclosure of, with edits, U.S. provisional application 61/306,258, filed Feb. 19, 2010. The complete disclosure of U.S. provisional 61/306,258 is incorporated herein by reference. A claim of priority is made to U.S. provisional 61/306,258 to the extent appropriate.

FIELD OF THE DISCLOSURE

The present disclosure relates to warning light systems, components and techniques. Such systems are generally used on the roof a vehicle, such as a police car or other emergency or safety vehicle. Systems and assemblies of the type of concern herein include a plurality of warning light pods, each light pod having a selectively moveable reflector arrangement that can change the direction toward which light generated within that pod is cast. The particular assemblies, components, techniques and principles described herein, are ones in which light generated in the warning light pods is generated by light emitting diode (LED) units or arrangements.

BACKGROUND

Warning light arrangements, sometimes referenced as emergency light, warning light or light signal systems, are widely used on a variety of types of vehicles. In a typical application, a warning light system is positioned on the roof of a vehicle such as a police vehicle or similar vehicle. In general, a characteristic of such warning light systems is that they provide light visible at least from perspectives facing toward the front and toward the rear of the vehicle. The systems are generally configured to provide a variety of selected light displays often involving "flashing" or "rotating" lights of various colors, for example selected from red, amber (yellow), blue and white.

In some arrangements, individual lights are aligned in a direction generally perpendicular to an axis of forward movement of the vehicle, so that maximum light visibility (of the light arrangement) is primarily from perspectives directly in front of the vehicle and/or directly behind the vehicle. Improvements in such arrangements have been developed (as for example described in U.S. Pat. Re 36,245 (of U.S. Pat. No. 5,097,266), U.S. Pat. Nos. 5,422,673 and 6,100,791, incorporated herein by reference) to provide a significant visibility off axis; for example from locations to the front and off to a side of the vehicle, such as might be the perspective of a person driving toward (or entering) an intersection toward which the emergency vehicle is also approaching from a cross street.

Many such warning lights systems have typically used halogen lights. With halogen light arrangements, color variation is often provided by transmitting light from the halogen light source through a colored optic or lens. With such an arrangement, luminous efficiency is lessened by the coloring, since the cover lens operates as a filter for the light.

In recent years, LED systems (light emitting diode systems) have become desirable for use in generating light, as opposed to halogen lights, in a variety of circumstances. It has been desired to develop warning light arrangements for use by mounting on vehicles, typically vehicle roofs, which provide for a variety of options of light effects and which can use LED arrangements for light generation. Herein, some advantageous arrangements, features, components and techniques are described.

SUMMARY

According to the present disclosure, selected features, components, techniques and principles usable in a warning light assembly are described. Also described are methods and techniques for assembling and using a warning light assembly. There is no specific requirement that a given assembly, component, principle or application involve all of the advantageous features characterized herein, in order to obtain some benefit according to the present disclosure.

An example warning light arrangement is depicted and described that includes a moveable reflector light pod array therein. The term "moveable reflector light pod array" is meant to refer to an array including a plurality of moveable reflector light pods; each moveable light pod comprising a light-generating arrangement and a selectively moveable reflector from which light can be directed (reflected or projected; i.e. cast) from a light-generating arrangement. In general terms, light from the light-generating arrangement is directed into the selectively moveable reflector arrangement and is then projected outwardly from the light pod by the moveable reflector arrangement, as directed. For example, the moveable reflector arrangement can be configured to rotate around a pod vertical axis, directing light around a 360° arc during rotation.

Thus, a typical moveable reflector light pod arrangement comprises a first plurality of moveable reflector light pods, each moveable reflector light pod comprising a selectively moveable reflector arrangement and a first plurality of LED units configured and oriented to direct light against the selectively moveable reflector arrangement. The term "selectively moveable" is meant to indicate that the reflector arrangement can be rotated or moved if desired, but there is no specific requirement that the warning light arrangement only be operated while the moveable reflectors are moving (for example rotating or oscillating). When it is said that the plurality of LED units is configured and oriented to direct light against a selectively moveable reflector arrangement, it is meant that each member of the LED units is configured to direct light, into the moveable reflector arrangement for reflection therefrom, during at least one selected orientation of the reflector arrangement. There is no requirement by this that all LED units within a selected pod must be configured to direct light against the selectively moveable reflector arrangement (to be reflected outwardly from the pod) at all times. Thus, in at least some applications, and in at least some selected positions of the selectively moveable reflector arrangement, less than all of the LED units within a given pod may be positioned to direct light against the reflector arrangement and outwardly from the pod at a given time or reflector arrangement position.

In general, the first plurality of moveable reflector light pods is configured in the moveable reflector light pod array to provide (define) at least: a first side viewable group of the light pods, typically comprising at least two (2) of the light pods and usually at least three (3) of the light pods; and, an opposite, second side viewable group, typically comprising at least two (2), of the light pods and usually at least three (3) of the light pods. Also, the light pods are typically and preferably positioned and configured to provide: a front viewable group, typically comprising at least three (3) and usually at least five (5) light pods; and, rear viewable group, typically comprising least three (3) and usually at least five (5) light pods.

Herein, reference to "front viewable" is meant to be a reference to viewable or visible from a perspective in front of the moveable reflector light pod array, i.e. from in front of a vehicle on which the light pods are used. The term "rear viewable" is meant to be a reference to visible or viewable from a perspective toward the rear of the light pod array, i.e. from behind a vehicle on which the light pods are used. Thus, the light pod assembly and the light pod array can be characterized as having a front and rear. Again, these will generally correspond to directions analogous to the front and rear direction of the vehicle on which the warning light assembly is used.

The reference to "side viewable" is meant to refer from a viewpoint to a side of the vehicle. Thus, the moveable reflector light pod arrangement and the warning light assembly can be characterized as having first and second, opposite, sides, which sides would each generally correspond to one of two opposite sides of a vehicle on which the warning light assembly is used.

Herein, when it is said that the moveable reflector light pod arrangement provides or defines both a front viewable group and a rear viewable group, it is not meant that the two groups are mutually exclusive. Thus, the same individual light pods can be in each of the front viewable group and the rear viewable group. Indeed, in a preferred embodiment depicted herein, each light pod is viewable from both the front and rear, and thus each is in the front viewable group and the rear viewable group.

Further, there is no requirement that the members of the first side viewable group and the second side viewable group be mutually exclusive either. Indeed, in an arrangement depicted herein, at least one member of the first side viewable group, the foremost or front member, is also in the second side viewable group.

Also, there is no requirement that a light pod of the first and second side viewable groups not be also in the front and/or rear viewable groups. Indeed, in arrangements described herein, each member of each side viewable group is also in both the front viewable group and the rear viewable group.

Herein, when it is said that a light pod is "visible" or "viewable" with respect to a particular perspective, it is not meant that the entire light pod is necessarily viewable, but only that a sufficient portion of the light pod is viewable for a person at the perspective defined to be able to discern light projecting therefrom. Example arrangements are described, in which a significant portion of each pod is viewable from the orientation defined.

Some various specific and advantageous features and configurations are described, for assemblies in general accord with the above principles.

BRIEF DESCRIPTION OF THE DRAWINGS

FIG. 7 is a schematic side elevational view of a police vehicle having a warning light assembly in accord with FIGS. 1-6 operably positioned thereon; in FIG. 7 no specific effort having been made to show precise relative scale between the vehicle and the warning light assembly.

FIG. 8 is a schematic top perspective view of a rotating reflector light pod or pod assembly usable in the warning light assembly.

FIG. 9 is a schematic top plan view of the light pod of FIG. 8.

FIG. 22 being taken generally along line 22-22, FIG. 21.

FIG. 23 is a second, schematic, cross-sectional view of the dome component of FIGS. 20 and 21; FIG. 23 being taken along line 23-23, FIG. 21.

FIG. 24 is a schematic front elevational view of the dome component of FIGS. 20 and 21.

DETAILED DESCRIPTION

I. Some Related LED Warning Light Arrangements

In U.S. Ser. No. 61/178,354, filed May 14, 2009 and in U.S. Ser. No. 61/178,548, filed May 14, 2009, each of which is incorporated herein by reference, warning light arrangements are described in which LED (light emitting diode) light sources (i.e. LED units) are used in the light generation. The LED units depicted, in U.S. Ser. No. 61/178,354 and 61/178, 348 however, do not use rotating reflectors. Thus, while the arrangements can provide for very good visibility, they are limited in some applications.

In U.S. Ser. No. 12/341,666, filed Dec. 22, 2008 and incorporated herein by reference, rotating reflector LED light pod arrangements are described. With arrangements such as described therein, light generated by a plurality of LED units is directed into a moveable reflector, for example that can rotate though selected arcs, typically 360° arcs. Such arrangements can be quite effective in providing a highly visible warning light over a substantial arc (for example a 360° arc).

In some instances, arrangements such as described in U.S. Ser. No. 12/341,666 are referred to as "rotating LED" or "moveable LED" arrangements. This is because the appearance due to the moveable reflectors is of light emitting from rotating LED units. However, since it is not the LED or LED units that move, but rather it is a reflector arrangement within the light-generating arrangement (pod) which moves, herein the preferred terms used for such units are "moveable reflector" or "moving reflector" light pod arrangements and variants thereof.

Herein, principles for, and configurations of warning light arrangements are described, which use principles of moveable reflector LED units, for example such as described in U.S. Ser. No. 12/341,666, to provide advantageous warning light arrangements.

II. An Example Arrangement, Generally, FIGS. 1-7

Figure 1:
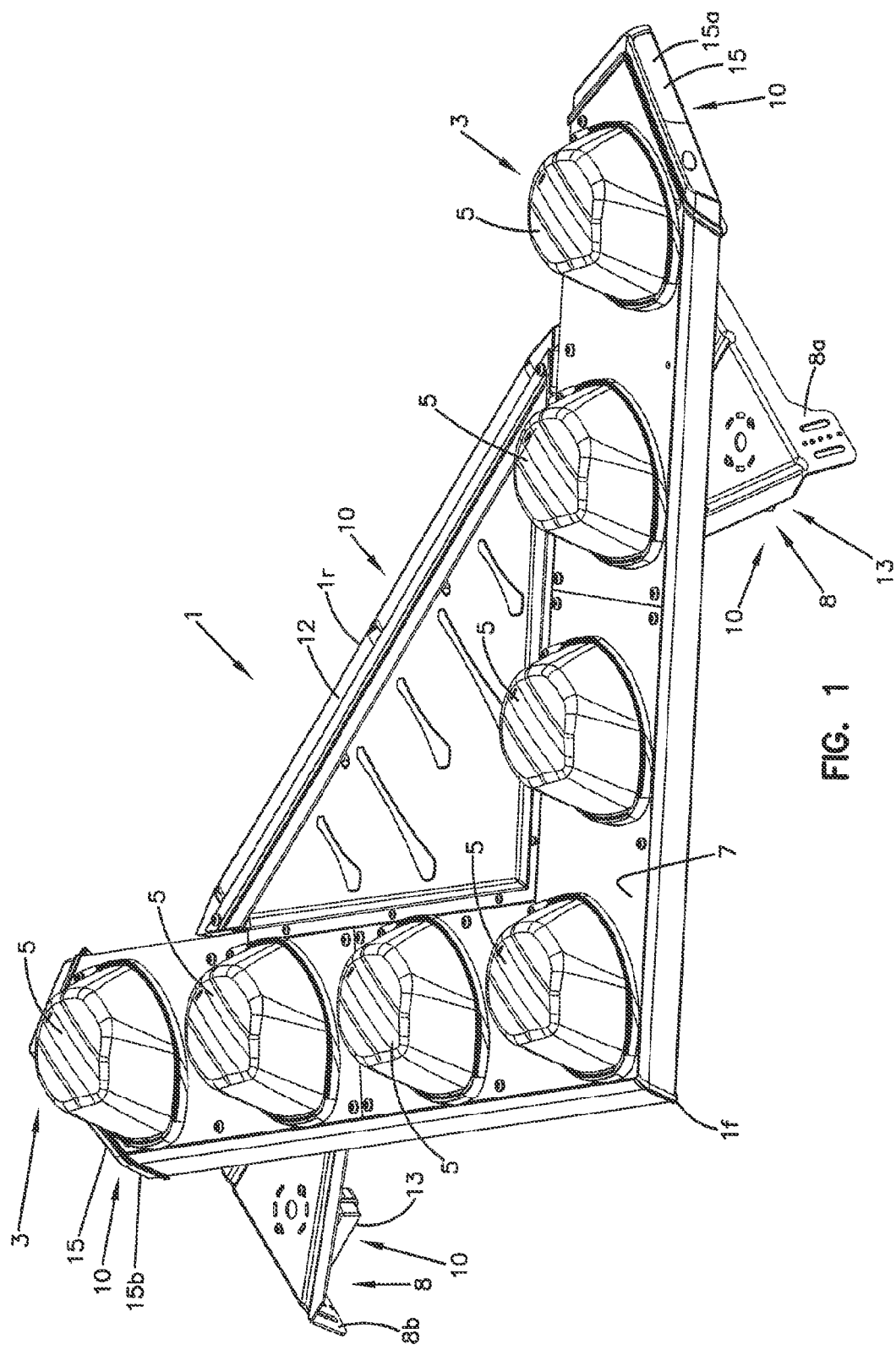
FIG. 1 is a schematic top perspective view of a warning light arrangement or assembly according to the present disclosure.

Reference numeral 1, FIG. 1, generally indicates a warning light assembly or arrangement according to the present disclosure. The assembly 1 includes a moveable (or moving) reflector light pod array 3 comprising individual (moveable or moving) reflector light pods 5 positioned in the array 3 in a preferred manner for desirable light effects, in accord with the intended use of the warning light assembly 1. The individual light pods 5 are mounted on a base frame 7.

Herein, the terms "moving reflector light pod", "moveable reflector light pod" and variants thereof, are meant to refer to a light pod that includes therein at least one selectively moveable light reflector. There is no specific requirement that the reflector be moved at all times, during operation of a given light pod, for the light pod to be a "moveable" or "moving" reflector light pod. There is also no specific requirement as to the nature of the movement that can be selected, when movement is selected. However, in a typical arrangement, the moveable (or moving) reflector is a rotating reflector, capable of rotating through a selected arc (typically a 360° arc) around a substantially vertical (pod) axis, in use. The arrangement can be configured for selected rotation in either one of two possible rotating directions (clockwise or counter-clockwise) when viewed from the top; and some arrangements can be configured for selected (alternative) rotation in each of the two possible directions. Further, the speed of rotation is a matter of choice, and some arrangements can be configured to allow variations in speed of rotation. Typical speeds of rotation would be selected from within the range of 2-200 rpm, inclusive, although variations are possible.

It is noted that another mode of movement that such arrangements may be configured to provide, is oscillation. This would be when the reflector is moved back and forth along a described arc. Some arrangements can be configured and programmed for either selectively, oscillation or rotation.

It is important to recognize that the term "moveable" or "moving" in this context is meant to distinguish light pods or light arrangements in which light-generated therein is not directed toward a reflector that can be moved (during operation) relative to the light, to change light direction from the pods. Such arrangements may be characterized as "fixed light projection" arrangements, "fixed reflector" arrangements, "non-moveable" reflector arrangements, "non-moveable light direction" arrangements or by similar terms.

Referring again to FIG. 1, the light assembly 1 includes a mounting bracket arrangement 8, in the example comprising individual brackets or bracket members 8a, 8b positioned and configured to secure the base frame 7, and a remainder of the warning light assembly 1, to a vehicle in use.

Still referring to FIG. 1, the warning light assembly 1 includes an optional auxiliary light arrangement 10, providing for selectable light effects in addition to those provided by the moveable reflector light pods 5. Although alternatives are possible, the particular example auxiliary light arrangement 10 depicted, includes: a rear (typically straight or arrow) non-moveable light direction arrangement 12; a front, forwardly directed, (takedown) non-moveable light direction arrangement 13, in the example depicted comprising first and second, takedown, light members 13a, 13b, FIG. 3; and, a lateral (side or alley) non-moveable light direction arrangement 15, in the example depicted, comprising first and second, opposite, side or alley light members 15a, 15b. Herein when reference is made to the first and second, "opposite", side or alley light members 15a, 15b, it is not meant that the alley light members 15a, 15b are necessarily precisely oppositely directed relative to one another, but rather that they are positioned on opposite sides of a vehicle direction central alignment axis discussed below, or, alternatively stated, that each is directed generally away from an associated side of a vehicle on which the light assembly 1 is used.

As will be understood from further descriptions below, a characteristic of the auxiliary light arrangement 10 depicted, is that each member thereof includes a light-generating arrangement which does not have a moveable reflector arrangement therein, i.e. which is not configured to selectively cause change in light direction (projection) in use. Typically, the light-generating arrangements of the auxiliary light arrangement 10, i.e. specifically of: takedown arrangement 13; alley light arrangement 15; and rear, straight, (arrow) light arrangement 12, are each such that each comprises one or more LED light-generating members (LED units) not configured to direct light into a rotating or moving reflector and not configured for changing direction of light directed therefrom. In at least this manner, the auxiliary light arrangement 10 differs from the moving reflector light pods 5 of the moving reflector 3 light pod array. It is noted that the auxiliary light arrangement can comprise non-LED lights (for example halogen lights).

Figure 2:
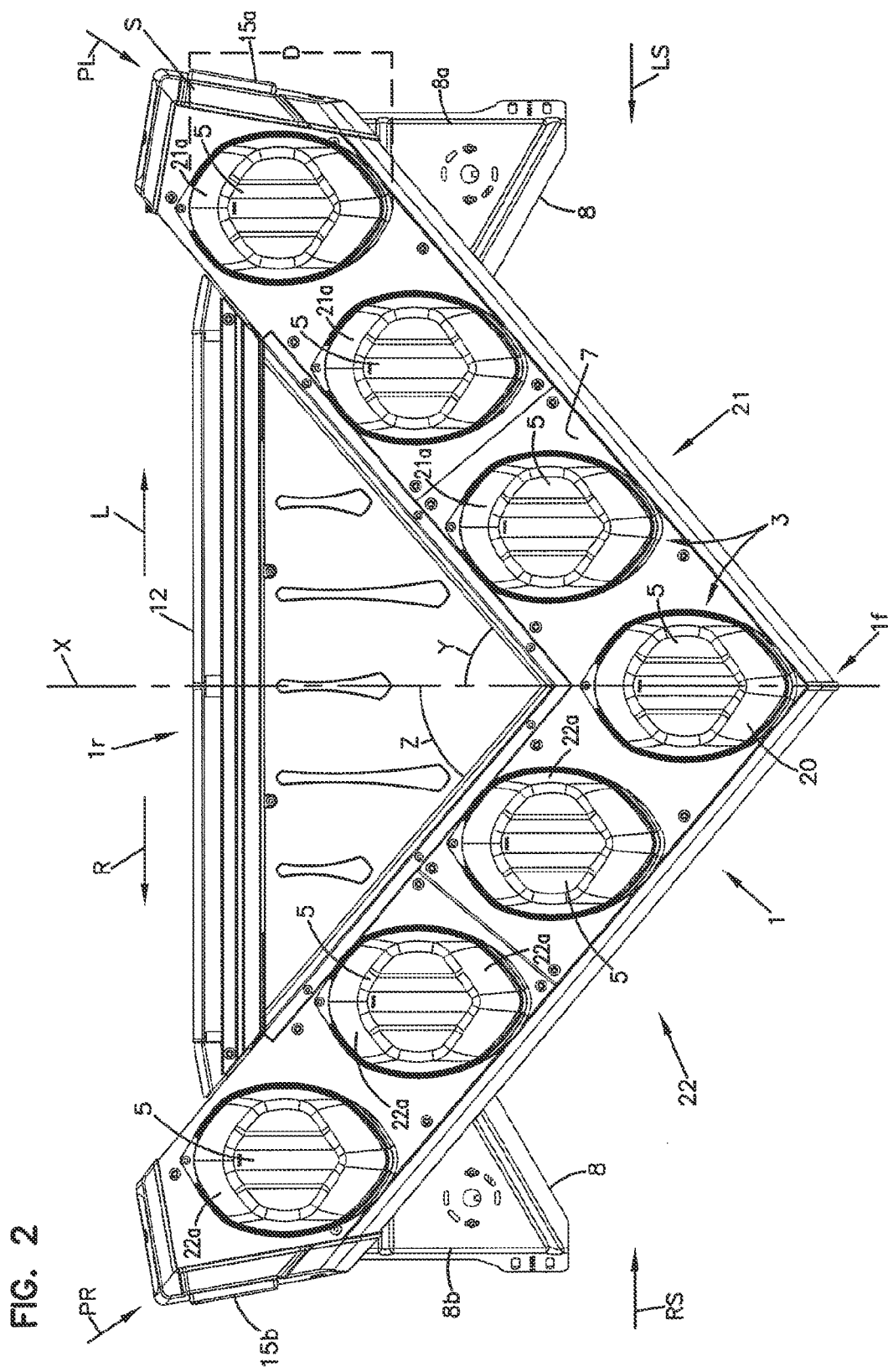
FIG. 2 is a schematic top plan view of the warning light assembly of FIG. 1.

In FIG. 2, a top plan view of the warning light assembly 1 is depicted. By reference to FIG. 2, general operation of the warning light assembly 1, and possible, desirable, light effects that can be created thereby can be understood. Referring to FIG. 2, the warning light assembly 1 can be characterized, in general, as having or defining a vehicle direction central alignment axis X. The term "vehicle direction central alignment axis X", and variants thereof, is meant to refer to an axis that is generally aligned with a vehicle straight ahead or forward direction, when the assembly 1 is mounted for use. There is no specific requirement, however, that the central alignment axis X be perfectly aligned with a vehicle forward axis or direction, when mounted. Typically, when the assembly 1 is mounted for use, an effort will be made to align axis X with a central forward direction axis of the vehicle to the extent reasonably possible, however.

Thus, in general, axis X is aligned to extend in the front/rear direction of the vehicle, i.e. away from the vehicle front end and the vehicle back end. One side of the axis X will generally face away from the one side of the vehicle, and a second side of the axis X will face away from a second, opposite, side of the vehicle.

Still referring to FIG. 2, the assembly 1 generally has a front 1f and a rear 1r. The front 1f is a portion of the assembly 1 directed forwardly of the vehicle, when the assembly 1 is mounted for use. The rear 1r faces generally opposite the front, and thus rearwardly of the vehicle, when the warning light assembly 1 is mounted for use.

Referring to FIG. 2, it is typically desirable that the warning light assembly 1 include, adjacent the rear 1r, and facing rearwardly, an auxiliary light arrangement 12. Thus, the light arrangement 12 is mounted in the warning light assembly 1 along the rear 1r in extension generally along a direction perpendicular to the central axis X. The light arrangement 12 is typically (optionally) an arrow light arrangement that is configured so that the operator of the vehicle on which the warning light assembly 1 is used, can select a mode of operation in which the light assembly 12 provides a warning light display comprising a light sequence that creates the appearance (effect) of a directional arrow in one or the other of two possible directions. A typical example can be an amber light array of LED units oriented so that the vehicle operator can create: a left-directing (from the drivers' forward facing perspective) amber arrow (see arrow L, FIG. 2) or, a right-directing amber arrow, from the drivers' forward facing perspective; (see arrow R, FIG. 2) as desired. Such arrows would be viewable from behind the vehicle, as a set of lights in flashing its sequence either to the left or to the right as selected. Typically, the arrow light arrangement or bar 12 would comprise a plurality of LED units, each oriented, for example, with the use of reflectors and/or other optics to direct (project or cast) light outwardly from assembly 1 generally in the direction of axis X away from rear 1r, i.e. in a direction opposite front 1f.

In more general terms, the optional arrow light arrangement 12 can be characterized as comprising one or more LED units, (each being a non-moveable light arrangement) and each oriented to direct light relative to the vehicle direction central alignment axis X, at an angle within the range of 0°-20°, inclusive; typically 0°-15°, inclusive; and, usually 0°-10°, inclusive. The reference to a direction of light, with respect to any light unit characterized herein, is meant to refer to a central or general direction. It will be recognized that any given light or LED unit may direct light over an angle or arc, i.e. in a spreading pattern in projection away from the assembly 1.

It is noted that in the previous paragraph, reference was made to angle of "0°" relative to the central axis X. Of course, this would be in a direction parallel to the axis X, and in the typical configuration would be with the LED unit within the light arrangement 12 oriented to direct light as parallel to axis X as reasonably possible, with each LED unit likely having some light diffusing or spread effect.

It is noted that there is no specific requirement that each and every LED unit in the arrow light arrangement 12 direct light in precisely the same direction, relative to axis X. However, typically during assembly, an effort will be made to orient each LED unit within the light arrangement 12 to direct light in the same direction, to the extent reasonably possible.

Still referring to FIG. 2, the moveable reflector light pod array 3 generally comprises individual pods 5 positioned in the warning light assembly 1 so as to provide an option of good visibility of light from at least selected ones of the pods from any point of observation 360° around the vehicle (and spaced from the vehicle). Although alternatives are possible, to accommodate this the particular array 3 depicted comprises: a front, center, pod 20; and first and second sets 21, 22 of pods; individual members of set 21 being indicated at 21a and individual members of set 22 being indicated at 22a, FIG. 2.

In the example depicted, front, center, pod 20 is a selected one of the pods 5 oriented most adjacent a forward most portion of front 1f and centered on the vehicle direction central alignment axis X, although alternatives are possible. In the example depicted, the first set 21 comprises an alignment of individual pods 21a oriented in a group slanting rearwardly and laterally from pod 20, in the example depicted positioned along a line extending at an acute angle Y relative to axis X. The acute angle Y indicated in FIG. 2, may be referred to as a "rear lateral declination" angle for set 21.

In the example depicted, set 22 is analogously positioned to set 21, but on an opposite side of central axis X from set 21. In the example depicted, it too comprises individual pods 22a spaced in a group oriented, typically, in alignment along a line slanting rearwardly and laterally from front pod 20 at a declination angle Z, i.e. the acute angle Z of alignment in rearward extension relative to axis X away from axis X in a direction opposite set 21. Typically, the assembly 1 will be configured so that angles Y and Z are the same, each being typically within the range of 30°-70°, inclusive, usually within the range of 40°-60°, inclusive, and often within the range of about 45°-55°, inclusive, relative to vehicle direction central alignment axis X.

Still referring to FIG. 2, it is noted that there is no specific requirement that the individual units 21a in set 21, or that the individual units 22a in set 22, all be oriented face forward and centered on a line. However, such a linear relationship as depicted, for each set, is typical and advantageous for achieving, in an efficient manner, the preferred light effects described herein.

Referring to FIG. 2, it can be seen that when positioned on a vehicle, the light assembly 1 is configured to provide good visibility of a plurality of the moving reflector light pods 5 from any orientation 360° around the vehicle. Preferred pod positioning for individual pods 5 to facilitate this is depicted. The light effects available with respect to the individual pods 5 can be contrasted with the light effects from light bar 12, which can generally only be seen well from behind the vehicle.

Thus, in general terms, when viewed toward a vehicle (passenger or driver perspective) left-side (or drivers' side—U.S.), especially in a left perpendicular view, in the general direction of arrow LS, front center pod 20 and individual pods 21a, set 21 are viewable, typically each being viewable at least 40%, usually at least 50%, of a front/rear (i.e. side) dimension of each pod 5 in alignment with axis X; that dimension corresponding to dimension D, FIG. 2. This (left-side or LS) view is shown in FIG. 4, discussed below.

Analogously, when viewed toward the right side (passenger or driver perspective, passenger side—U.S.) a portion of front pod 20 and individual pods 22a of set 22 are viewable, see the orientation arrow RS, FIG. 2. Thus, for the assembly 1 depicted, FIG. 2, from the orientation of the right (RS) side (arrow RS) a mirror image view to FIG. 4 would be provided, with respect to the pods 5; leaving at least 40%, typically at least 50% of the front/rear dimension D of each viewable pod 5 (corresponding to pod 20 and pods 22a) viewable from the right side.

Figure 3:
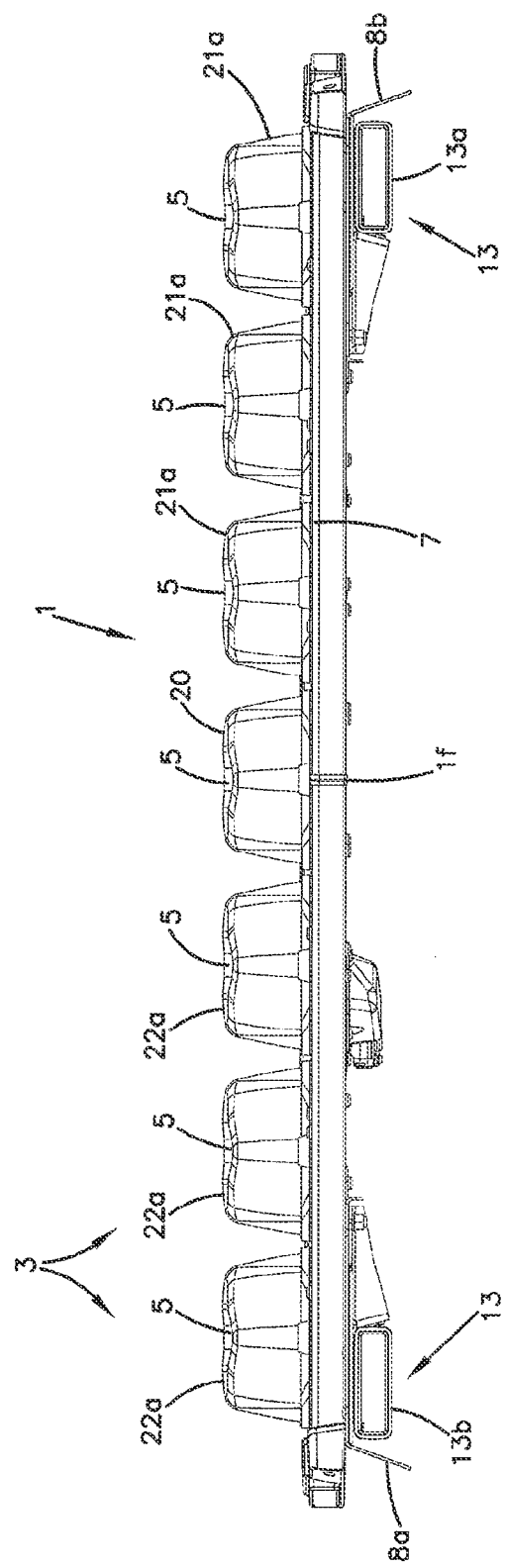
FIG. 3 is a schematic front elevational view of the warning light assembly of FIGS. 1 and 2.
Figure 4:
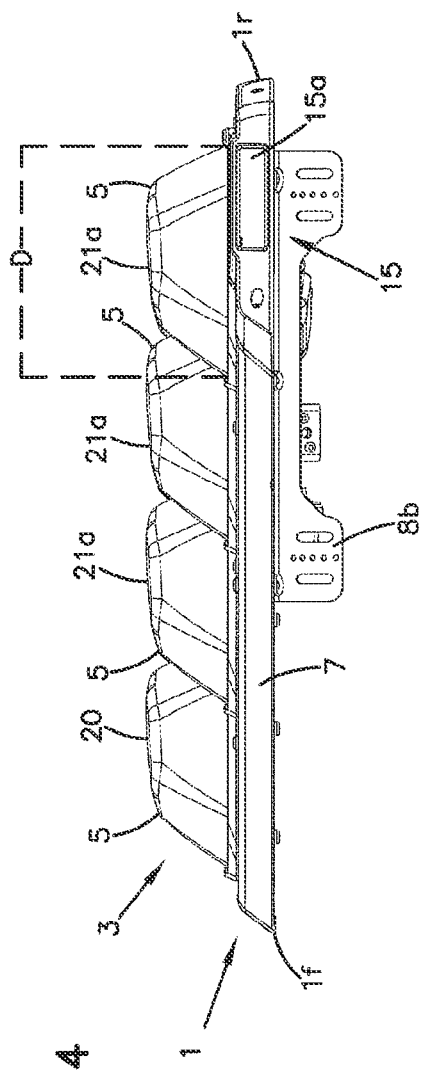
FIG. 4 is a schematic first side elevational view of the warning light assembly of FIGS. 1-3.
Figure 5:
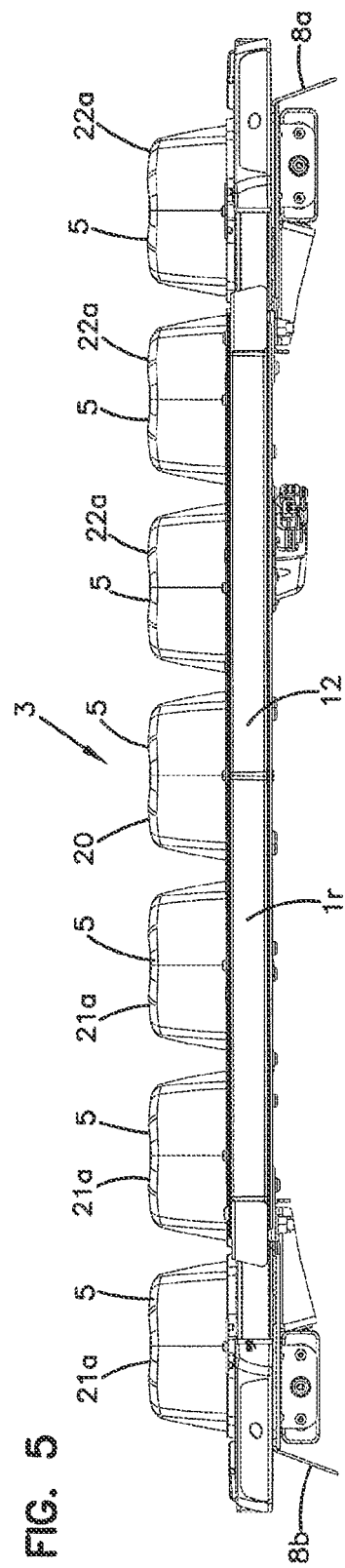
FIG. 5 is a schematic rear elevational view of the warning light assembly of FIGS. 1-4.

This ease of visibility of pods 5 will be in part understood by review of FIGS. 3-5. Attention is first directed to FIG. 3. FIG. 3 is a front elevational view of the assembly 1. Thus, it is a view taken generally toward front 1f. From directly in front of the vehicle, light effects from all seven (7) of the depicted individual pods 5 (FIG. 2) can be seen. However, light bar 12, FIG. 2, cannot be seen.

In general terms used herein, and referring to FIG. 3, the moveable reflector light pod array 1 can be characterized having a first plurality of moveable reflector light pods 5. The first plurality of moveable reflector light pods 5 can be characterized as configured to provide (define) a front viewable group (in this instance comprising all of the light pods 5) generally comprising at least three (3) light pods, typically at least four (4) light pods, usually at least five (5) light pods and sometimes at least seven (7) light pods. In the example depicted, the first plurality of moveable reflector light pods comprises seven (7) light pods and every light pod is a member of the front viewable group, since each can be seen from a perspective facing the front if of the moveable reflector light pod array.

Still referring to FIG. 3, optional takedown light arrangement 13, comprising individual light arrangements 13a, 13b, can be seen. In the example depicted, the light arrangements 13a, 13b are positioned in assembly 1 at locations on opposite sides of vehicle direction central alignment axis X, FIG. 2. In FIG. 5, individual light arrangements 13a, 13b of takedown arrangement 13 can be seen as positioned underneath base 7 directed forwardly, i.e. in the same direction as front if and generally forwardly of the vehicle in use. The takedown light arrangements 13a, 13b, can, for example, comprise LED light arrangements that do not include moveable reflectors (i.e. they are non-moveable reflector light projection LED units). Units 13a, 13b can be used by a vehicle operator to selectively direct light forwardly of the vehicle, for example when the emergency vehicle is parked facing a detained person or vehicle. The takedown light arrangement 13a, 13b would often be selected to comprise white light (i.e. broadband) LED sources, although alternatives are possible.

Attention is now directed to FIG. 4. In FIG. 4, a first side (LS) elevational view of assembly 1 is provided. The particular side visible in FIG. 4, is from the viewpoint of arrow LS, FIG. 2. This would correspond to the vehicle left side i.e. to the left side of the vehicle defined by the perspective of forward facing passengers. In the United States, with vehicles typically configured with the driver on the left, this is sometimes referred to the as "driver's side" of the vehicle. Herein, the view may sometimes be called a "left perpendicular view," when the view is directly toward the axis X at 90°, and centered on the assembly 1.

Referring to FIG. 4, it can be seen that from directly left of the vehicle at least portions of each of: the front and center pod 20; and, each member 21a of the first set 21, are visible. Preferably, the pods 20, 21 are configured in the array 3 such that from a left perpendicular (LS) view, at least 40%, typically at least 50%, of a dimension D of each pod 5 that can be seen is visible. That dimension, again, is indicated generally in FIG. 4 at D, and corresponds to a front-to-rear dimension of the associated pods 5.

Comparing FIGS. 3 and 4, it is noted that in the left side (LS) perpendicular view, FIG. 4, not every one of pods 5 is necessarily viewable. In the example depicted, in LS view, FIG. 4, however, each one of the center pod 20 and each member 21a of the first set 21 is viewable, whereas none of the members 22a of the second set 22 is viewable. Thus, it is pods 20 and 21a that can be seen at least 40%, typically at least 50%, with respect to a dimension D of each.

In general terms used herein, then, and referring to FIG. 4, the first plurality of moveable reflector light pods 5 can be characterized as including a first side viewable group of at least two (2) light pods, typically at least three (3) light pods and in the example depicted comprising four (4) light pods. These would correspond to pods 20 and 21a. It is noted that in the example depicted, each member of the first side viewable group is also a member of the front viewable group.

It will be understood that typically, and preferably, an opposite right side (RS) view, in the general direction of arrow RS, FIG. 2 would be analogous; and the individual pods 22a in set 22, FIG. 2, will typically be aligned similarly. Thus, in the terminology used herein, the moveable reflector light pod array 3 includes a first plurality of moveable reflector light pods 5 having a second side viewable group of at least two (2) light pods, typically at least three (3) light pods and in the example depicted at least four (4) light pods. In the example depicted, these would correspond to pods 20 and 22a. Thus, pod 20 is in both the first side viewable group and the second side viewable group. Further, in the example depicted, all of the members of the second side viewable group are in the front viewable group.

Still referring to FIG. 4, attention is now directed to LED unit or light member 15a of optional alley light arrangement 15. Alley light member 15a is generally directed laterally (sideways) relative to vehicle direction central alignment axis X, in the example depicted also slightly forwardly. Alley light arrangement 15a is configured for a vehicle operator to selectively direct light away from a side of the vehicle, for example to see down an alley way or to see buildings, building features, landscape features, etc. Typically, individual members of the alley light arrangement 15, for example units 15a, 15b, comprise one or more light generating systems, typically LED units, configured to selectively project white light, although alternatives are possible. Referring again to FIG. 4, the alley light arrangement 15, in particular member 15a, can be seen as mounted on base frame 7. The same would typically be true for unit 15b, FIG. 2, usually positioned as a mirror image on an opposite of axis X. Typically, individual units 15a, 15b are configured to direct the light slightly forwardly, and thus are oriented so that the light is directed at an acute angle, forwardly, relative to axis X, FIG. 2, selected from the range of 1°-20°, inclusive; typically within the range of 1°-15°, inclusive. For unit 15a, this angle is generally indicated at S, FIG. 2.

Attention is now directed to FIG. 5, a rear elevational view of assembly 1. It can be seen that in the example assembly each one of pods 5 is fully viewable from directly behind the vehicle, i.e. from the rear. Thus, in the language used herein, the moveable reflector light pod array 5 can be characterized as including a first plurality of moveable reflector light pods 5 configured to provide a rear viewable group of at least three (3), typically at least five (5) and in the example depicted comprising at least seven (7) light pods 5. Also in the example depicted, each member of the rear viewable group of light pods is also a member of the front viewable group of light pods; each member of the first side viewable group (pods 20 and 21a) is a member of the rear viewable group; and, each member of the second side viewable group (pods 20 and 22a) is a member of the rear viewable group.

From a comparison of FIGS. 1-5, it can be seen that, for the example depicted, in a 360° pattern around the vehicle, at any location, light from a plurality of individual pods 5 will be directly viewable. For example, even if the viewer happens to be oriented, FIG. 2, to look directly down one of the sets 21, 22, i.e. in a direction of one of arrows PR, PL, at least one and typically at least two, individual members of the other set (22, 21) can project light directly viewable to that viewer.

Thus, in the assembly 1, the moving reflector light pod array 3 is configured to provide for high visibility of light cast from the pods 5.

Figure 6:
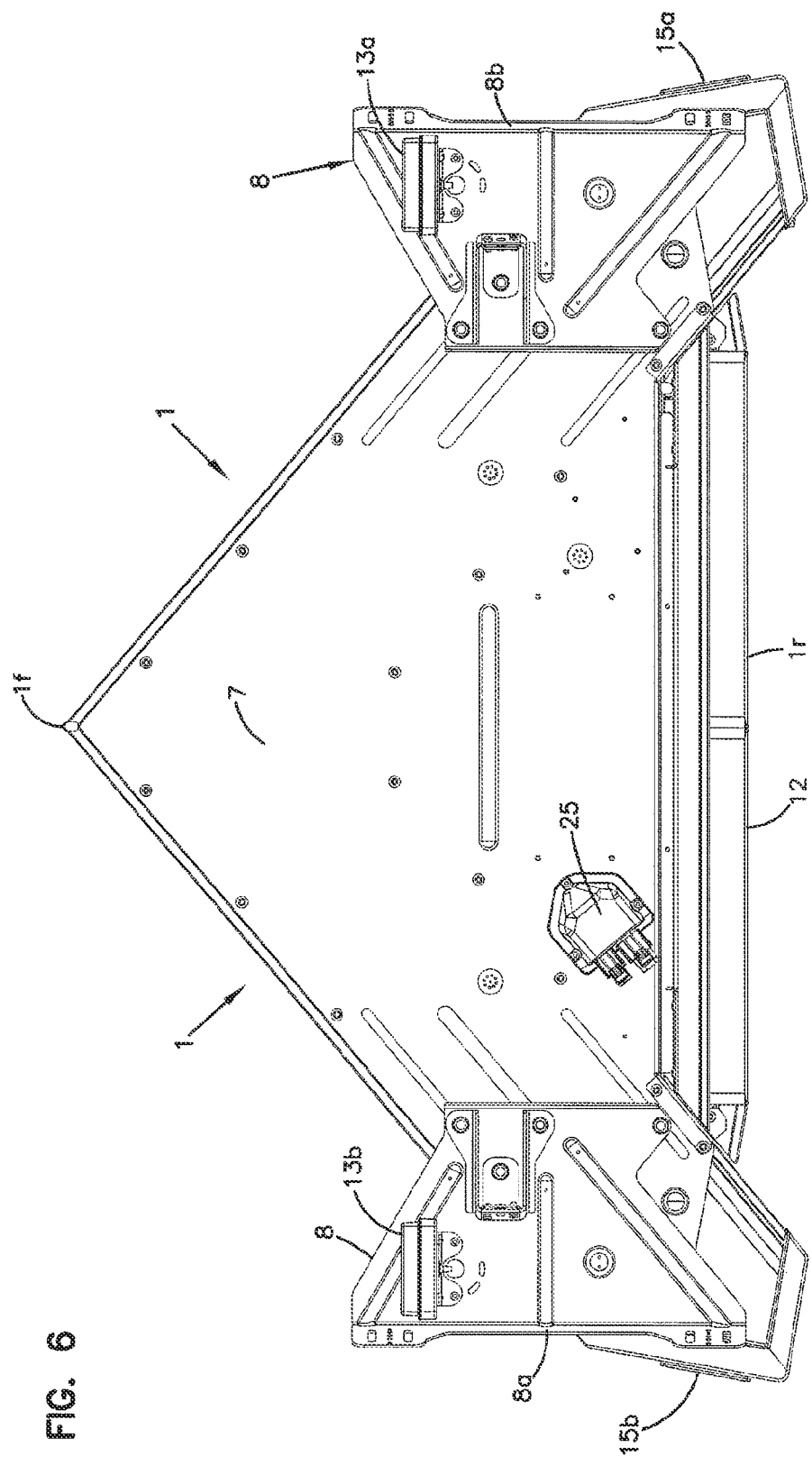
FIG. 6 is a schematic bottom plan view of the warning light assembly of FIGS. 1-5.

In FIG. 6, a bottom plan view of assembly 1 is depicted. Mounting of the optional takedown lights 13a, 13b can be seen, underneath base frame 7. In the particular example assembly 1 depicted, the takedown lights 13a, 13b are shown each mounted on one of the brackets 8a, 8b, which are then secured to base frame 7. Still referring to FIG. 6, connector member 25 is viewable mounted underneath frame 7, providing for electrical connection (i.e. power and control connection) to the assembly 1.

In FIG. 7, a schematic depiction is provided of a vehicle 30 including a warning light assembly 1 mounted thereon oriented appropriately for use. It is noted that there is no specific effort made in providing the schematic view of FIG. 7, to provide for a precise scale relationship between assembly 1 and the vehicle 30. This would be a matter based upon selection of a specific size of each. However, from FIG. 7, a general orientation of a warning light assembly 1 relative to features of the vehicle 30 can be understood. Referring to FIG. 7, the front of the vehicle is indicated generally at 30f and the rear of vehicle at 30r. The side 30s of the vehicle 30 viewable, is the right (or in the U.S., passenger) side (from a forward facing passenger perspective). Thus, the view of FIG. 7, is an RS view. In it, one can see pods 20 and 22a, as well as light unit 15b.

III. Selected Component Features

A. General Pod and Base Frame Features; FIGS. 8-14

From FIGS. 8-14, some general features of the pods 5 will be understood. Attention is first directed to FIG. 8, in which a selected one of the pods 5 is depicted. It will be understood that the moving reflector light pod array 3, FIG. 1, can be configured using a plurality of similar or even identical pods 5.

Referring to FIG. 8, the individual pod 5 depicted, includes a dome or cover 35. The cover or dome 35 typically is configured to protect internal componentry, and for transmission therethrough of light generated within an interior 5i of the associated pod 5. Typically, the dome 35 will comprise plastic, having appropriate optic surfaces; i.e. surfaces formed and configured for acceptable levels of transmission of light therethrough. As an example, a polycarbonate plastic can be used.

The typical dome 35 has an upper or top end 37 which includes a relatively flat (in the example depicted slightly concave and forwardly tipped) central portion. In the example depicted, the top portion 37 is typically colorless (although alternatives are possible) and allows for passage of light vertically therethrough, to be viewable from above the vehicle, for example by a helicopter or airplane. Each pod 5 can be characterized as having a vertical axis, sometimes referred to as a pod vertical axis or by similar terms, which generally is an axis that passes vertically through the pod 5 in use, and around which an associated moveable reflector arrangement rotates (or in some instances oscillates) in use. Such a pod vertical axis is indicated generally in side views of pod 5, see FIGS. 10 and 11.

Referring again to FIG. 8, the dome 35 includes a sidewall arrangement 40 extending around the dome 35. The sidewall arrangement 40 comprises, in the example depicted, the following sections: front (left, and right) panel sections 40l, 40r; left side section 40s and opposite, right side section 40t; and, rear section 40b. Between various adjacent ones of the sections, 40l, 40s, 40b, 40t, 40r are provided transition regions 40v. A specific example dome is discussed below in connection with FIGS. 20-24.

Still referring to FIG. 8. In general sections 40l, 40r are configured to slant substantially rearwardly as they extend vertically, so as to provide for an aesthetically pleasing appearance and aerodynamic effect. The two side sections 40s, 40t are generally more vertical in their extension than regions 40l, 40r, to lead to less internal reflection and thus good light transmission. The rear section 40r is generally substantially conical with some angle forwardly in upper extension, for desirable appearance, without as great an angle of slant as sections 40r, 40l, so as to have more desirable internal reflection characteristics.

The sidewall arrangement 40 may be provided colorless in some systems. It can also be colored as discussed below.

Attention is now directed to FIG. 9, in which the dome 35 is viewable in a top view. The example dome 35 is typically configured to be substantially symmetric on opposite sides of a central plane 45 extending between a front 35f and a rear 35r of the dome 35. When the pod 5 is mounted for use, typically each dome 35 is oriented with a central axis 45 either on axis X, FIG. 2, or substantially parallel thereto. By the term "substantially parallel" in this context, it is meant that axis 45 is typically oriented to be as much in alignment with axis X as reasonably possible.

Figure 10:
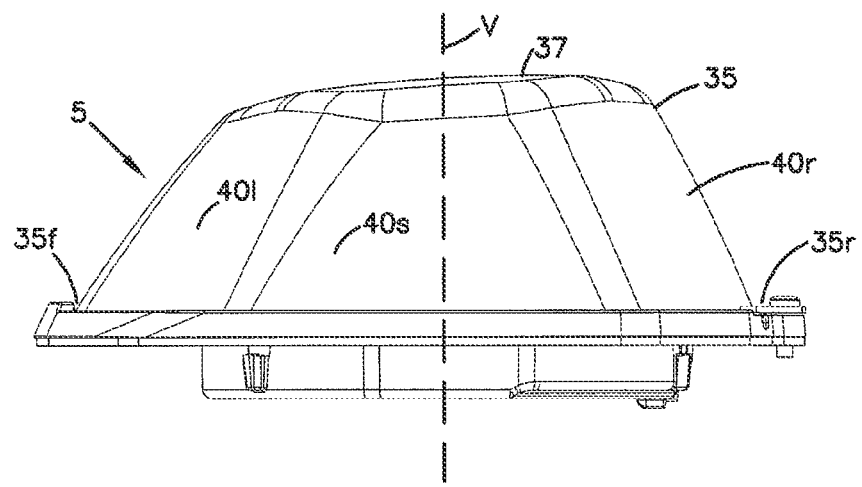
FIG. 10 is a schematic side elevational of the light pod of FIGS. 8 and 9.

In FIG. 10, a side elevational view of the pod 5, directed toward the orientation of arrow 46, FIG. 9, is provided. It will be understood that, at least with respect to the dome 35, an opposite view will typically be a mirror image.

Figure 11:
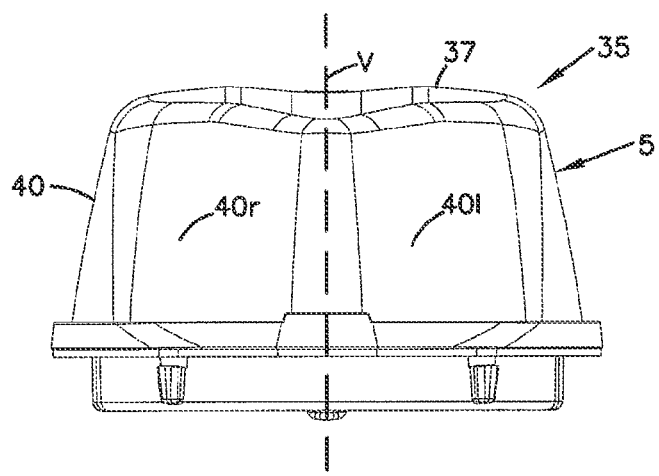
FIG. 11 is a schematic front elevational view of the light pod of FIGS. 8-10.
Figure 12:
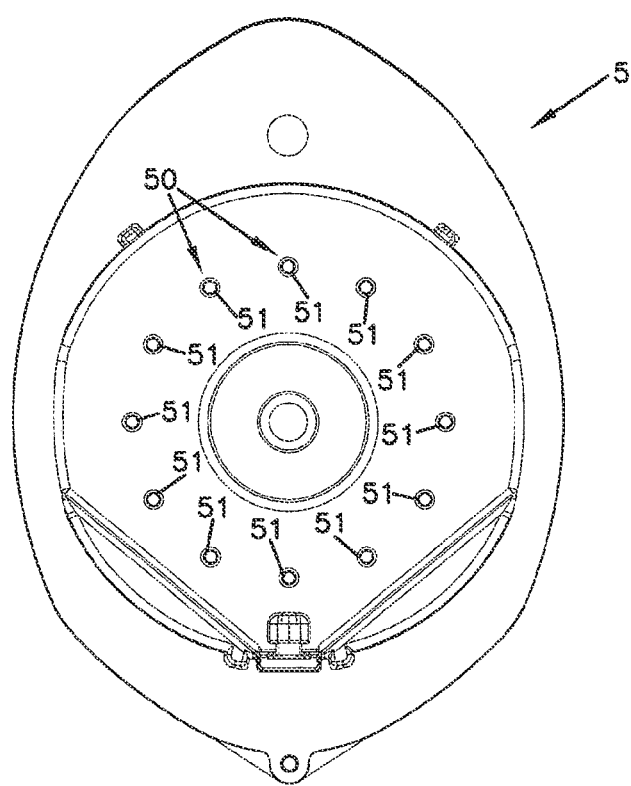
FIG. 12 is a schematic bottom plan view of the light pod of FIGS. 8-11.

FIG. 11, a front elevational view taken toward front 35f is provided. In FIG. 12, a bottom plan view is provided. Referring to FIG. 12, at 50, a ring pattern 51r is depicted, showing where individual LED members or chips 51 would be positioned. Each LED member 51 comprises an LED unit configured to direct light upwardly in pod 5. Further discussion regarding the LED chips 51 is provided below.

Figure 13:
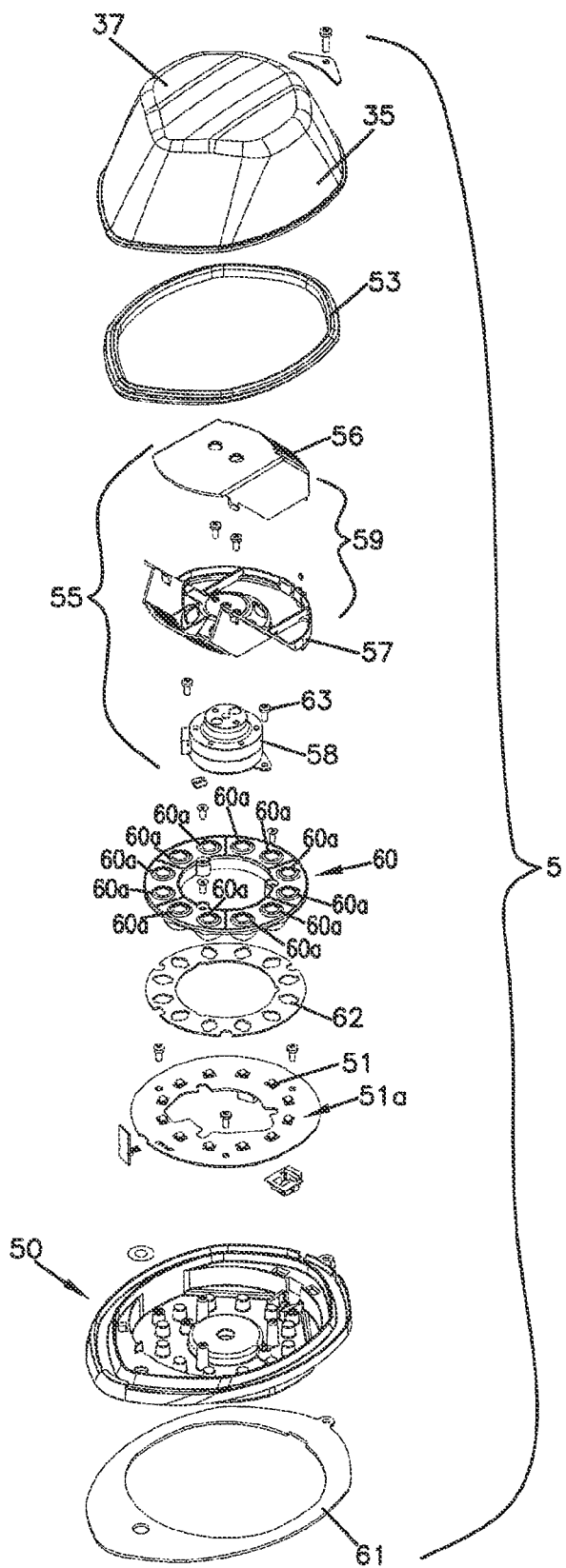
FIG. 13 is a schematic, exploded, perspective view of the light pod of FIGS. 8-12.

In FIG. 13, an exploded perspective view of a pod 5 is provided. Although alternatives are possible, the pods 5 can be in general accord with the descriptions of U.S. application Ser. No. 12/341,666 incorporated herein by reference. Referring to FIG. 13, key selected componentry of the pod 5, for providing moving (for example rotating or oscillating) light effects, is as follows. The pod 5 includes dome 35, which operates as a weather cover and optic member. The pod 5 further includes base assembly 50. The cover 35 and base assembly 50 are generally secured together with seal 53 therebetween, as a weather seal. The cover 35 and base 50 define a pod interior 5i, within which internal componentry is provided.

Among the internal componentry, as described in application U.S. Ser. No. 12/341,666 incorporated herein by reference, is depicted a moveable reflector assembly 55 comprising in the depicted example: reflector top or cover 56; reflector bottom 57; and, actuator or motor 58. The reflector cover 56 and bottom 57 are, when assembled, a moveable reflector 59 positioned on motor 58 to be selectively moveable, typically rotatable and/or oscilltable, as desired. The motor 58, then, provides for selected movement of a reflector arrangement 59 comprising a cover 56 and bottom 57; hence pod 5 is a moveable reflector light pod.

Still referring to FIG. 13, at 51a is provided an array of individual LED units or LED chips 51. The array 51a in the example depicted, comprises twelve (12) LED chips 51, positioned in a circle and each configured to generate light selectively. Further, the pod 5 includes therein a collimator optic 60 comprising a plurality of individual optic members 60a, one each associated with each LED chip 51a, and each oriented to direct light generated from the chip 51a upwardly in a generally columnar shape. Thus, optic member 60a generally directs the light from the LED members 51 into a focused pattern from each directed toward (i.e. into) the reflector arrangement 55.

The reflector arrangement 55 is discussed in greater detail below, in connection with FIGS. 15-18. In general terms, light from a plurality of LED units 51 is directed into the light reflector arrangement 55 for projection therefrom in a selected direction, no matter what rotational orientation of the reflector arrangement 55. Further, an advantageous reflector is depicted, in which at least one of the LED units 51 directs light upwardly through the top 37 of the cover 35 at various selected rotation of the reflector arrangement 55, to desirable effect. Again, features which account for this are discussed in greater detail below, in connection with FIGS. 15-18. Still referring to FIG. 13, at 61*a* gasket is depicted, and a spacer is depicted at 62. Further, various fasteners 63 are viewable.

Typically, the reference arrangements 55 will be configured to reflector lights therefrom in a relatively narrow beam, typically of no more than 60°, usually of no more than 45°, often of no more than 30°, and preferably 5°-25°. This can provide an intense visibility, as the beam sweeps past a viewer.

Figure 14:
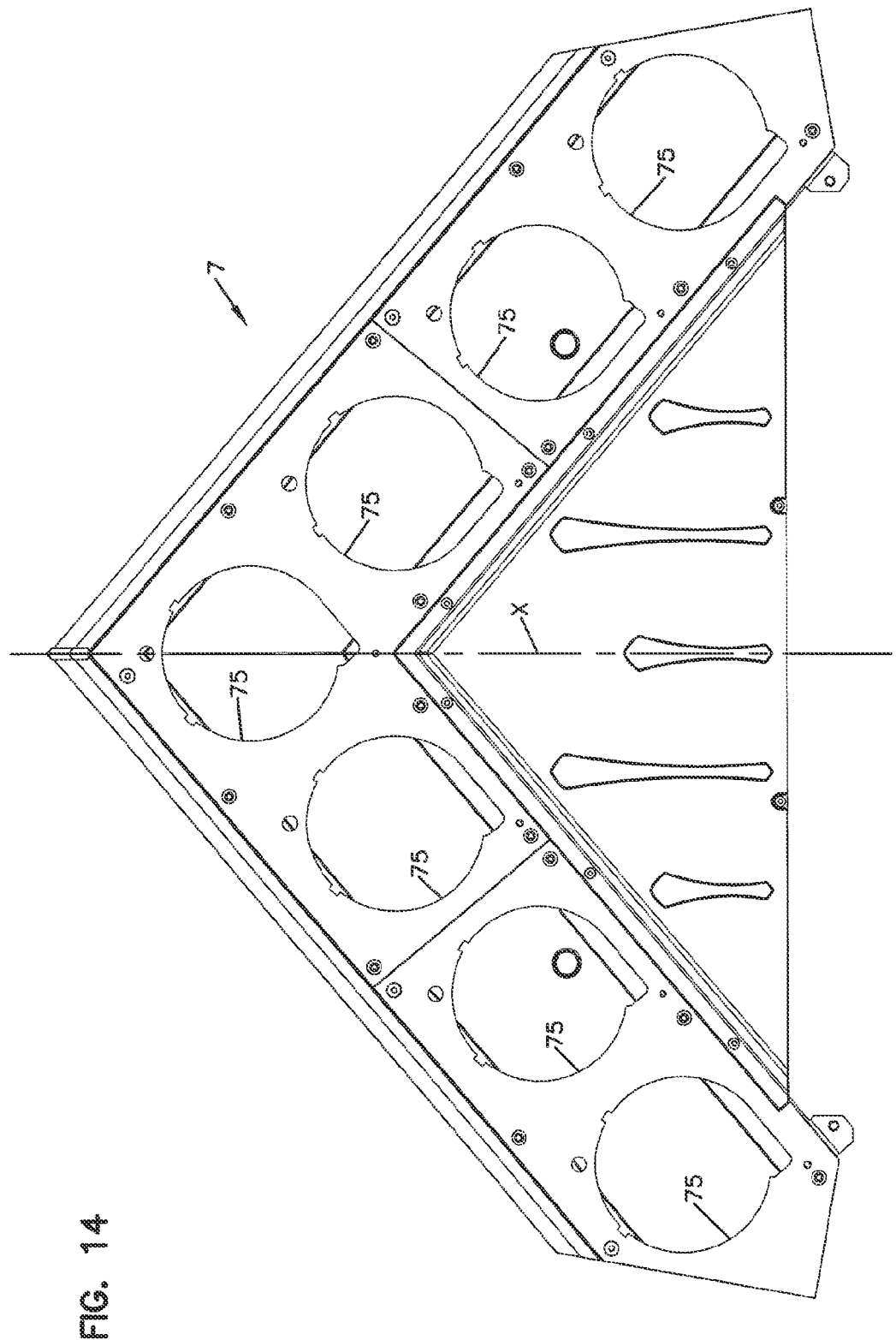
FIG. 14 is a schematic top plan view of frame base component of the warning light assembly of FIGS. 1-6.

In FIG. 14, base frame 7 is viewable, without pods 5 positioned therein. The base frame 7 can be seen of including a plurality of mounting apertures 75 therein, each configured to receive, projecting partially therein, one of the pods 5. The apertures 75 can be seen to include asymmetrically positioned alignment members or notches to ensure that when each pod 5 is mounted, it is properly oriented relative to the vehicle direction central alignment axis X.

B. Example Moveable Reflector Features, Generally, FIGS. 15-18

Figure 15:
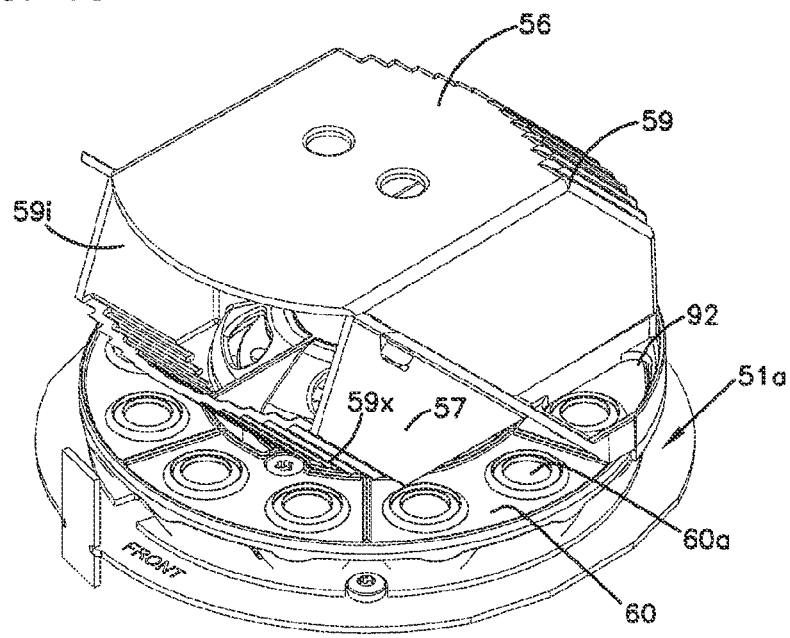
FIG. 15 is a schematic top perspective view of a rotating reflector member and LED unit of the light pod of FIGS. 8-13.

In FIGS. 15-18, selected views of internally componentry of the pods 5, when assembled, are provided. In particular, viewable are the components underneath the dome 37, FIG. 13 and above base 50. Thus, the overall reflector 59 comprising reflector sections 56, 57 is viewable. Referring first to FIG. 15, a top perspective view, it will be understood that the reflector 59 for the example assembly shown, is generally rotatable around a vertical axis (not depicted in FIG. 15, see FIGS. 17 and 18 at axis V).

Referring again to FIG. 15, the designation "front" indicates a lower portion of the depicted assembly that will be directed toward the assembly front 1*f*, FIG. 1, when installed (and as the reflector member 59 rotates). The light projection direction 90, FIG. 16, will generally rotate (or oscillate) around a selected vertical axis V, FIGS. 17 and 18, during use. Thus, a directional beam of light is projected by reflector arrangement 59 around a moving pattern, creating a 360° visibility if desired. Of course, selected different rotational patterns can be actuated, by the actuator 58, (FIG. 4) if desired.

Still referring to FIG. 15, each of the collimators or optics 60*a* directs light from a selected one of the LED units or chips 51, FIG. 5, upwardly. As the reflector 59 is rotated (or oscillated) about vertical axis V, it "catches" light from selected ones of the optics 60*a*, and LED units 51, and reflects that light in the forward direction 90; again, the forward direction 90 being whatever direction the reflector arrangements 59 at the moment happens to be directed.

Figure 17:
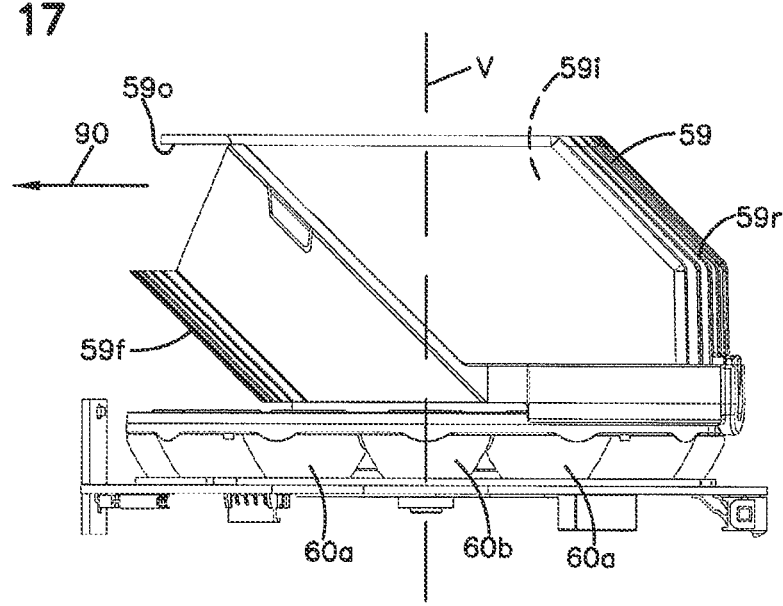
FIG. 17 is a schematic side elevational view of the rotating reflector member and LED unit of FIGS. 15 and 16.

Thus, moveable reflector 59 can be characterized as having a reflector "forward" or projection direction. The reflector forward direction is the direction outwardly from the reflector 59 toward which light generated within the pod 3 is directed, projected or cast, in use. In FIG. 17, a side elevational view of the componentry of FIG. 15 including the reflector 59 is shown. The reflector forward direction is indicated in FIG. 17, at arrow 90. Thus, the reflector 59 can be characterized as having, or defining, a reflector forward (projection or light cast) direction 90. For convenience, region 59*f* away from which light is projected in the forward direction 90, will be referred to as a "reflector front" or by similar terms. Thus, reflector 59 can be said to have a reflector front 59*f*. Of course, the reflector front 59*f* is selectively directed as desired, by the motor 58, FIG. 13, around vertical axis V.

In general terms, the reflector arrangement 59 includes a reflector exterior 59*x* (FIG. 15) and a reflector interior 59*i*. The reflector 59 is configured and positioned, relative to the LED units 51, FIG. 13, and optics 60*a*, FIG. 15, such that no matter what position reflector arrangement 59 is in, for example in a 360° rotation around axis V, at least six (6) LED units is directed thereagainst, typically at least seven (7) LED units are directed thereagainst, and usually at least eight (8) LED are is directed thereagainst, in a manner such that light from each of the directed LED units is reflected by the reflector arrangement 59 in the forward direction 90, whatever orientation the reflector 59 takes. This ensures, in general, that light cast or directed outwardly from the pod 5 by the reflector arrangement 59 is intensely directed in the beam. The reflector arrangement 59 includes a plurality of faceted surfaces along both the interior 59*i* and the exterior 59*x* to provide for this direction. Principles relating to this are described, for example, in U.S. Ser. No. 12/384,366.

Figure 18:
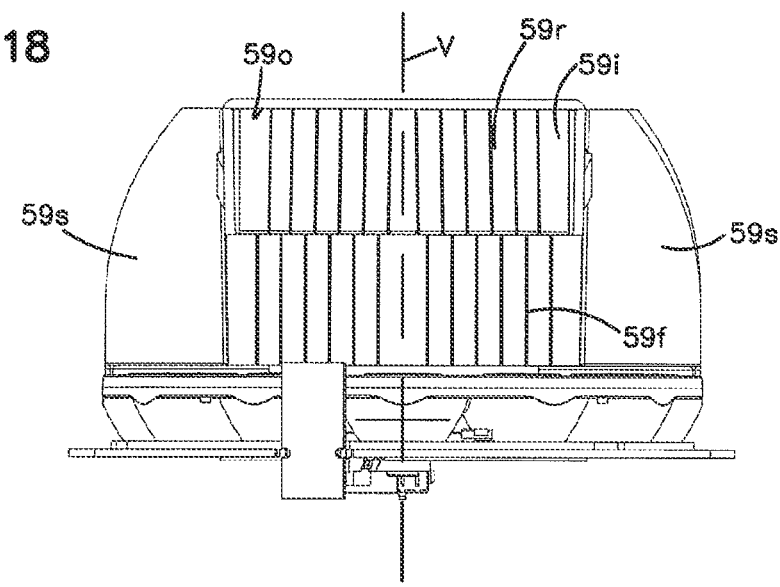
FIG. 18 is a schematic front elevational view of the rotating reflector member and LED unit of FIGS. 15-17.

Still referring to FIG. 15, it can be said that the example reflector arrangement 59 depicted, is configured and positioned, relative to the LED units 51 (FIG. 13) and optics 60*a*, such that for any given rotational position of the reflector arrangement 59 at least four (4) of the LED units is directed at the reflector exterior 59*x* and at least two (2) of the LED units is directed at the reflector interior 59*i*, to be cast into the beam 90. Typically it is configured so that at least four (4), usually at least six (6) and in some instances at least eight (8) of the LED units is directed toward the exterior 59*x*, and also such that at least four (4) and in some instances at least five (5) of the LED units 51, FIG. 13, is directed toward the interior 59*i*, each so directed that the units 51 then directed will provide light reflected in a direction of projection direction 90, again without regard to the rotational orientation of the reflector 59 around vertical axis V, (FIGS. 17 and 18).

Figure 16:
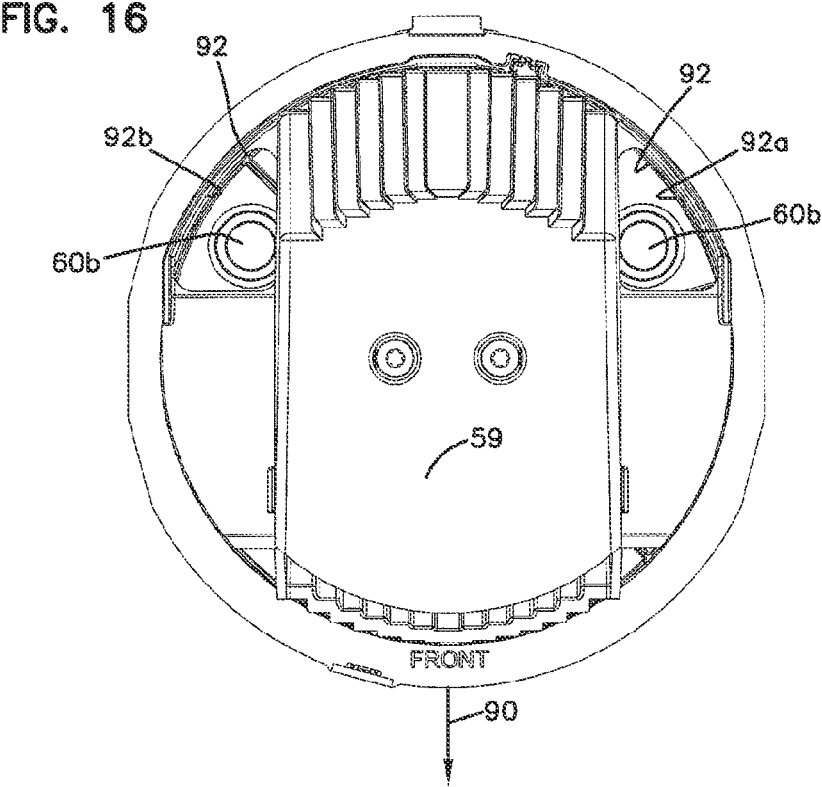
FIG. 16 is a schematic top plan view of the rotating reflector member and LED unit of FIG. 15.

Referring to FIGS. 15 and 16, it can be seen that the reflector arrangement 59 includes an upward or vertically directed aperture arrangement 92 therein (i.e. therethrough); in the example depicted, the arrangement 92, FIG. 16, comprising first and second spaced apertures 92*a*, 92*b*. The aperture arrangement 92 is configured to move over selected ones of LED units 51 and optics 60*a*, as rotation (or oscillation) around vertical axis V (FIGS. 17 and 18) occurs. Thus, light generated by units 51 and cast by optics 60*a* upwardly, will pass through aperture 92*a*, 92*b*, as reflector arrangement 59 is operated. This allows light to be directed upwardly through top 37 of dome 35, FIG. 13. While some strobing effect may occur, in the vertical direction, this will provide for a highly distinctive and visible light effect from above the vehicle, viewable for example from a helicopter, airplane or tall building.

In the general terms used herein, the moveable reflector arrangement 59 is characterized and configured so that at any one of the plurality of a selected rotational positions thereof, relative to the LED units, at least one LED unit (and typically at least two) is oriented to direct light upwardly past the moveable reflector arrangement. The plurality of selected positions can be spaced from one another, or the spacing can be characterized to provide for continuity. Typically, when spaced, some strobe effect again, may be provided. When the array 51*a* includes twelve units 51, it can be said that the moveable reflector arrangement has twelve specific positions toward which at least one LED unit (and typically at least two of the LED units) direct light from the pod 5 upwardly, and between those twelve positions are provided positions wherein at least one, and typically at least two units projects at least some of its light vertically, outwardly from pod 5.

In FIG. 16, a top plan view of the componentry viewable in FIG. 15 is provided. At 60b are provide selected ones of the optics 60a, which, for the particular rotational orientation of the reflector 59 depicted, project light upwardly through aperture arrangement 92. Of course, reflector 59 is rotatable around a vertical axis directed toward the viewer in FIG. 16, to change the projection direction 90 through a 360° arc.

In FIG. 17, a side elevational view of the componentry depicted in FIGS. 15 and 16 is shown. Again, the reflector 59 would be rotatable around central axis V to change the projection direction 90 through a 360° rotation. In FIG. 17, at 59f, selected faceted arrangements are shown, for directing light directed upwardly thereagainst, in a direction of arrow 90; and, in 59r are depicted exterior views of facets, which, in the interior 59i also provide for direction of light directed upwardly thereagainst outwardly from a reflector 59 in the direction of arrow 90.

In FIG. 18, an elevational view of the componentry depicted in FIGS. 15-17 is viewable, in the opposite direction of arrow 90, FIG. 17, i.e. toward interior 59i and opening 59o. The opening 59o allows light within interior 59i to be directed outwardly therefrom, in the direction of arrow 90, FIG. 17. Referring to FIG. 18, it is noted that surfaces 59s are also reflector surfaces, configured to direct light while passing over LED units in the general direction of arrow 90, FIG. 17.

Figure 19:
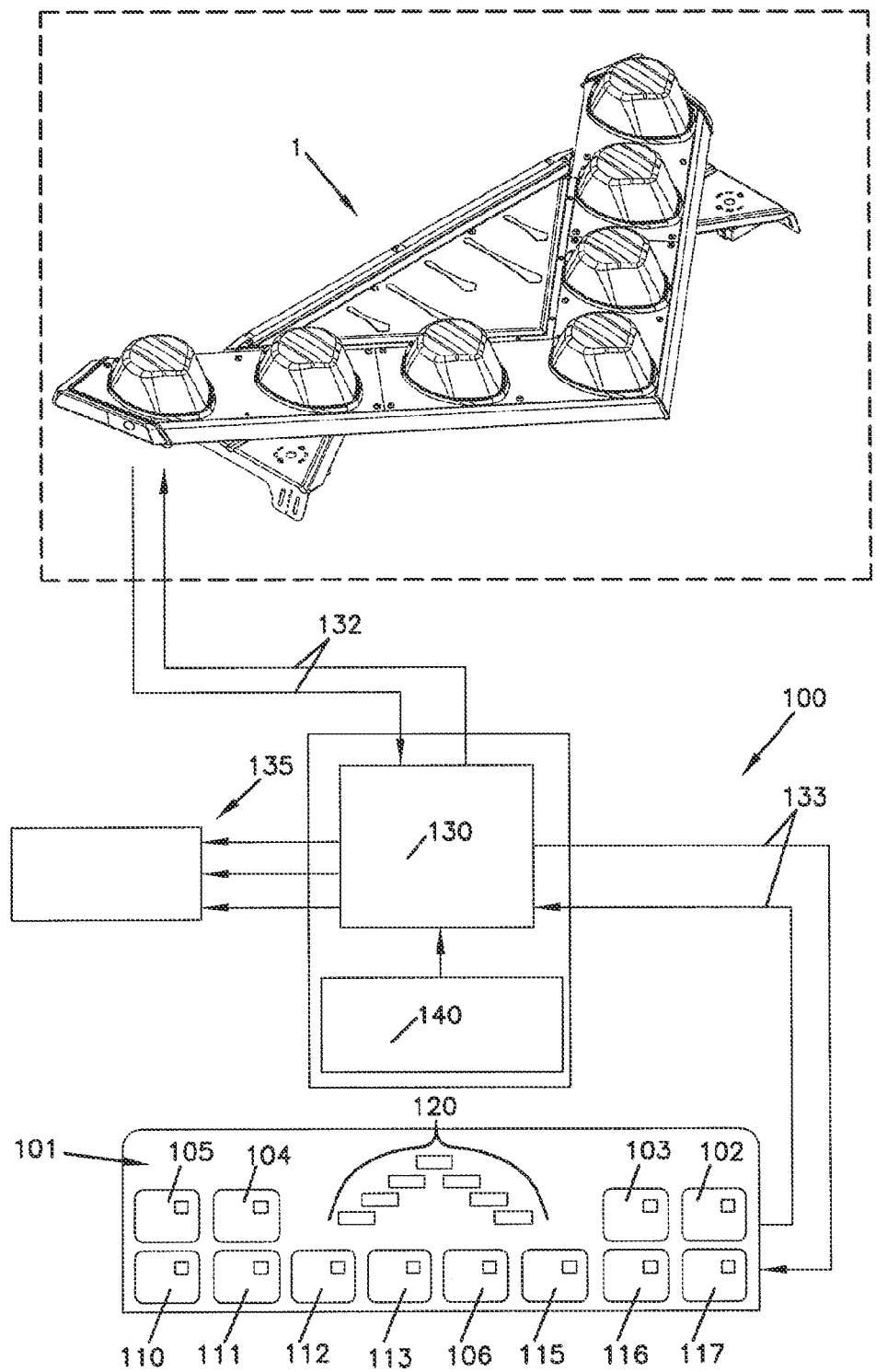
FIG. 19 is a schematic depiction of a warning light arrangement according to FIG. 1 depicted in association with a control unit for operation in accord with the principles described herein.

IV. Central Features; FIG. 19, Light Effects

A. Control Features

In FIG. 19, at 101 is provided an operator control pad or key pad. The key pad 101 is schematically depicted, and can include a variety of control members or keys to accomplish a variety of effects, as desired for assembly 1. Referring to key pad 101, in the example depicted at 102, is a key or switch usable to actuate alley light 15b; at 103, a key or switch acuatable to generate, in unit 12, a right arrow; at 104, a key or switch acuatable to generate in unit 12, a left arrow; and, at 105, a key or switch usable to actuate a left side alley light, 15a.

At 106 is a key or switch acuatable to operate takedown light arrangement 13. Keys 110, 111 112, and 113 can comprise switches for selecting modes of operation of the array 3 of the light pods 5. Keys 115, 116, 117 can be function keys to provide for variation in operation as described. Lights 120 can be used to mimic light bar function (light arrangement).

At 130 is provided micro-processor base control unit, for providing direction to the assembly 1 via circuit 132, and to receive direction from the control pad 101 via circuit 133. At 135 is provided an auxiliary device system, also controllable by micro-processor unit 130. Reference numeral 140 indicates, generally, power input.

A variety of micro-processors, circuit and key pad arrangements can be used. The intent with respect to FIG. 19, is to indicate, generally, a system which can be assembled, to provide in the interior of a vehicle, control pad 101 which can be used by a person within the vehicle to select a variety of lighting effects.

B. Light Effects

Typically, the individual LED units 51 will be selected to provide high illumination, i.e. will be high powered. For example, each may have a power on the order of 18-100 lumen, although variations are possible.

A variety of color effects can be selected. For example, each of the chips 51 can be selected to be a single color, or to be selected to provide, selectively, one of several colors. A typical chip will be a four color chip, allowing for any of red, blue, amber and white light.

Typical control options will be selected to allow for effects from among: reflector rotation rates and/or selective non-rotation; oscillation versus complete rotation; projected color; and, selected intensity, for any given pod. Preset choices can include, for example: a mode of selected lights for a stopped mode of the vehicle; a mode of selected lights for a slow vehicle mode; and, a mode of selected lights for a high speed pursuit mode. Options can be provided for selecting fixed reflector direction if desired. Further, modes can be selected so that as the reflector of a selected pod rotates, color and/or intensity changes.

The various types of effects referenced, can be accomplished by appropriate selection of the LED chips, and microprocessor capabilities. Electrical configurations to accomplish this, are within the general skill of the electrical circuitry art.

In additional, auxiliary equipment such as cameras, radar or sound projection members, can be positioned on the assembly 1. Various ones of the switches can be used to control these.

As indicated above, typically the reflector arrangements in the moveable reflector pods 5, will be chosen so that a narrow beam of light projects outwardly therefrom, typically spread over an angle not more than 60°, usually no greater than 45°, preferably no greater than 30° and typically within the range of 5°-25°. This can create a strong, narrow rotating beam effect for the light pods.

As to the non-reflector arrangements, for example used in the side lights 15 or the takedown lights 13, typically a fairly narrow focus beam will be selected for each, within the range of 5°-40°, although alternatives are possible.

As to the rearwardly facing lights of arrow bar 12, it is expected that choice will depend upon how widely visible it is intended for the lights to be. Typically, a fairly narrow beam, for example not greater than 60°, will be chosen.

V. Example Dome Configurations and Dimensions; Assembly Dimensions; Etc.

A. Example Dome Dimensions, FIGS. 20-24

Figure 20:
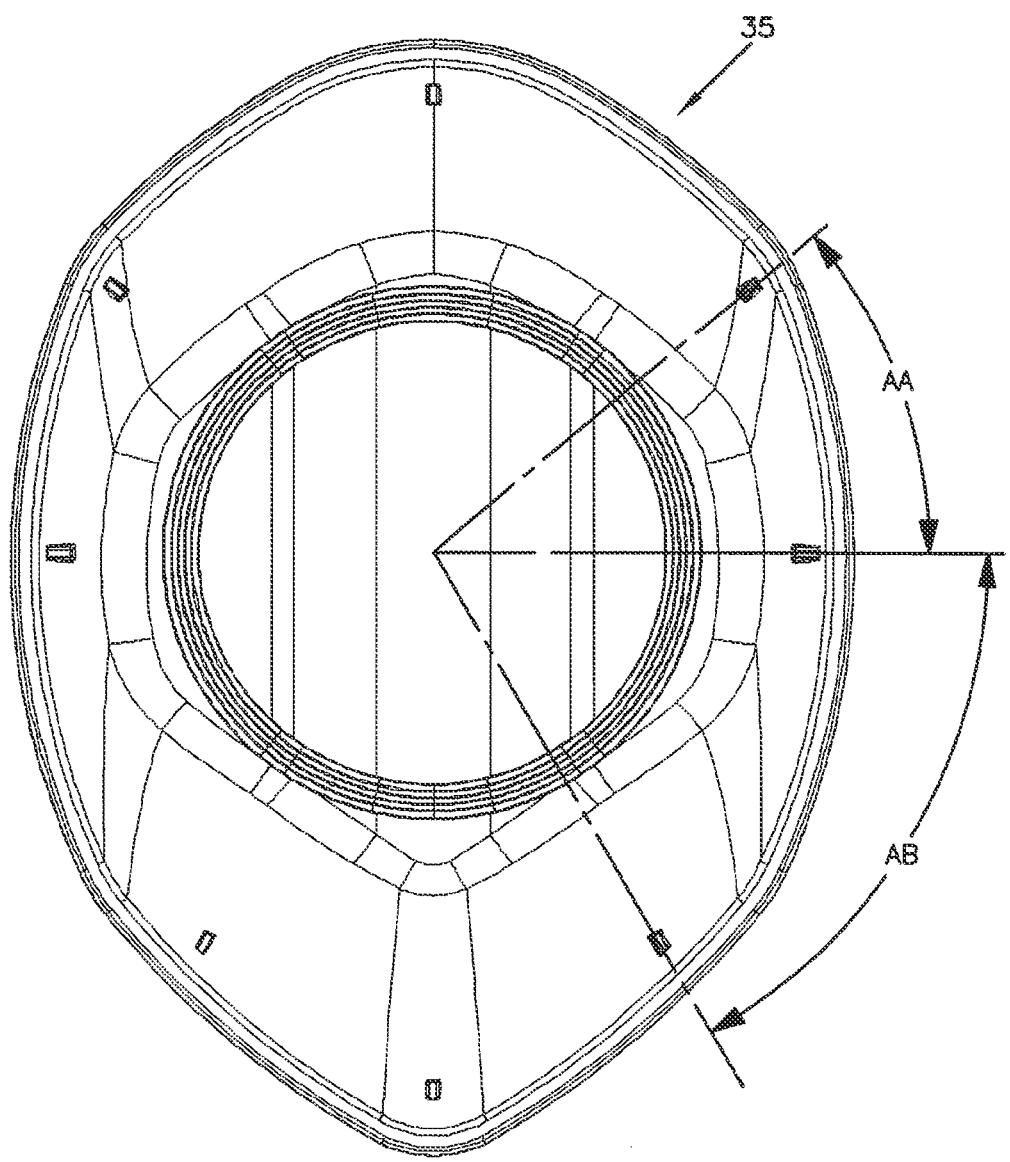
FIG. 20 is a schematic bottom plan view of a dome component of a light pod arrangement in accord with the present disclosure.
Figure 21:
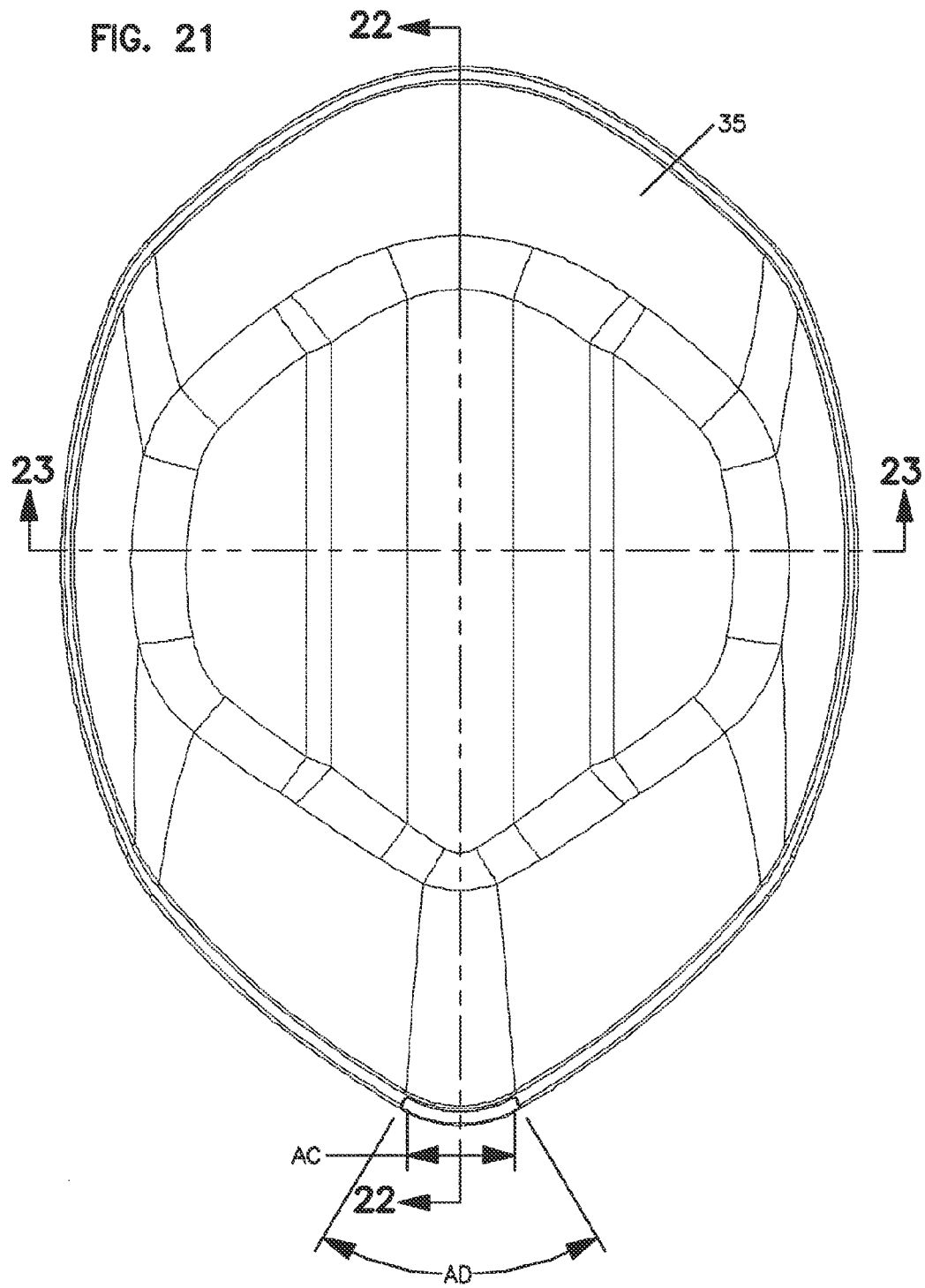
FIG. 21 is a schematic top plan view of the dome component of FIG. 20.
Figure 22:
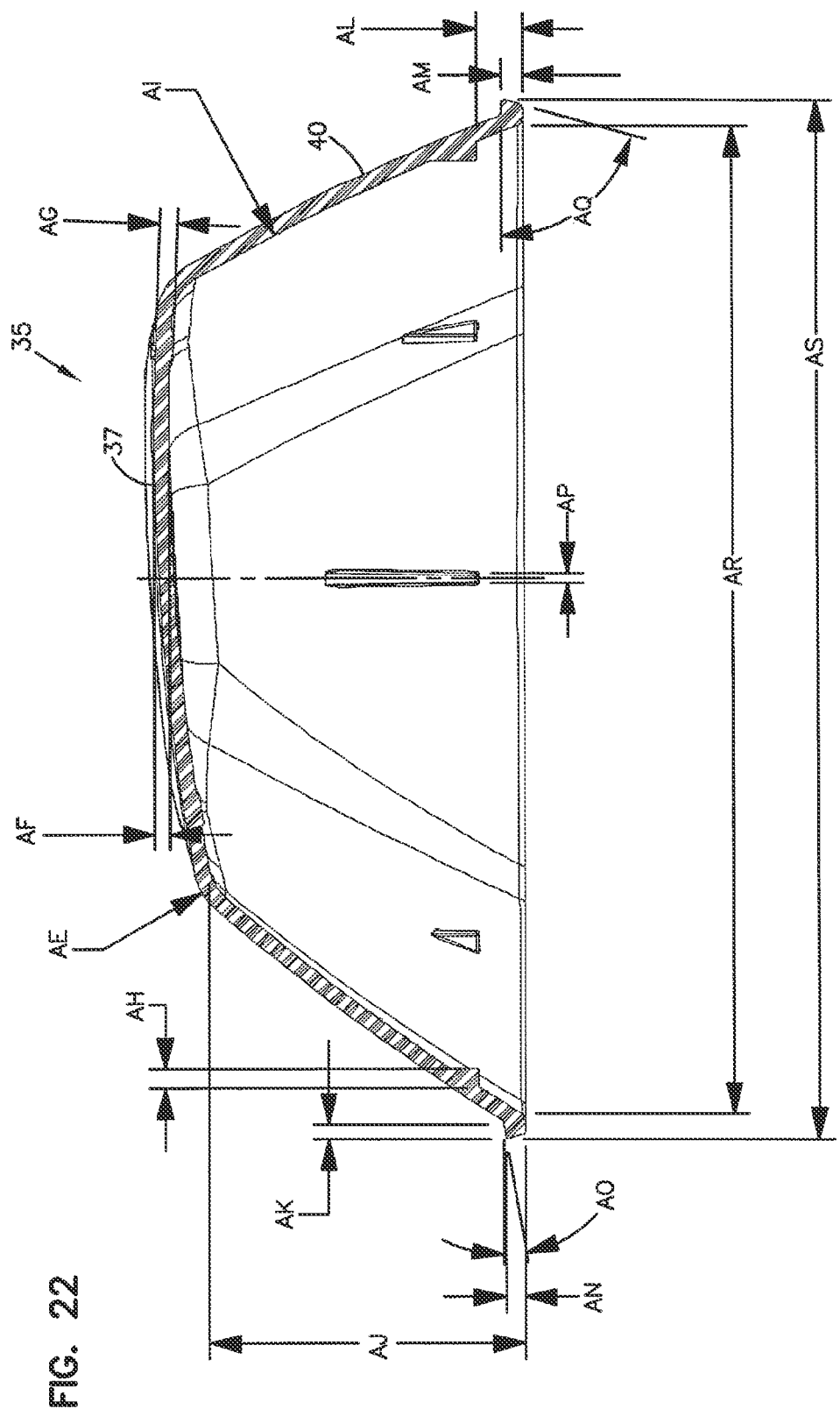
FIG. 22 is a schematic cross-sectional view of the dome component of FIGS. 20 and 21.

The dome configuration and dimensions are selected to provide for desirable aesthetics, aerodynamic effects and light projection. As indicated above, the dome 35 for each pod 5 is generally selected to provide for light transmission around a side portion and also, in typical instances, through at top 37 thereof. In FIGS. 20-24, an example dome 35 is depicted. In FIG. 20, the viewpoint is a bottom plan view of the dome 35. In FIG. 21, the example view is a top plan view of the dome 35. In FIG. 22, a cross-sectional view taken along line 22-22, FIG. 21, is provided. In FIG. 23, a cross-sectional line taken along line 23-23, FIG. 21, is provided. In FIG. 24, a front elevational view is provided.

Referring to FIGS. 20-24, example dimensions and angles for the example dome 35 depicted are provided as follows: AA=40°; AB=60°; AC=0.87 inch; AD=61.1°; AE=0.53 inch radius; AF=0.13 inch; AG=0.15 inch; AH=0.16 inch; AI=18 inch radius; AJ=2.55 inch; AK=0.111 inch; AL=0.38 inch; AM=0.17 inch; AN=0.16 inch; AO=10°; AP=0.08 inch; AR=8.09 inch, AS=8.5 inch; AT=1.12 inch radius; AU=17.9 inch radius; AV=0.2 inch; AX=5 inch radius; AW=2.83 inch; AY=5.95 inch, AZ=6.37 inch; and, BA=3.07 inch.

Of course, variations from the above characterized example dimensions for an example dome are possible, in accord with the principles described herein. However, the particular dimensions provided, generally characterize a preferred and advantageous example.

In more general terms, some desirable effects can be accomplished when the dome 35 has at least the following general characteristics: its total maximum height is no greater than about 3.7 inches (9.4 cm) typically no greater than 3.5 inches (8.9 cm); and, usually, no greater than 3.2 inches (8.1 cm). Its greatest width (in a direction generally perpendicular to axis X, i.e. in the direction of dimensions AY and AZ, FIG. 23) is preferably at least 5.6 inches (14.2 cm); and, typically is at least 5.8 inches (14.7 cm); its greatest length, front to rear, which generally corresponds to its dimension in alignment with axis X, is, preferably, no greater than 10 inches (25.4 cm); typically no greater than 9 inches (22.9 cm) and is usually no greater than 8.75 inches (22.2 cm); preferably its top region, i.e. the portion facing upwardly, has a slight concave shape and its tipped forward.

B. Example Overall Assembly Dimensions

Although alternatives are possible, typically the overall assembly 1, FIG. 1, is configured so that a dimension between the most forward point 1f and the central rear point 1r, in the middle of light arrangement 12 for the unit is depicted is at least 18 inches (43 cm) and typically at least 19 inches (48 cm); and, usually is no greater than 25 inches (64 cm). Typically, the greatest width (perpendicular to axis X) is at least 36 inches (91 cm) usually at least 39 inches (99 cm) and typically 40-50 inches (102-127 cm).

Thus, the assembly 1 is sufficiently large to accomplish the intended task without being unacceptably large for ease of convenience, assembly, and mounting.

C. Colors

Color patterns and effects will typically be a matter of choice. The assembly 1 can be provided to generate a variety of color light effects; or, it can be manufactured to specific color effects chosen in advance.

It is anticipated that typically light in the optional rearwardly facing light arrangement 12 will be selected to project amber light. To accomplish this, typically individual LED units therein will be selected from chips that generate amber light. In the alternative, unit 12 can be provided with an amber cover, with white light generated therein, filtering providing for the amber effect. It will typically be preferred to use LED units that generate amber lights, for efficiency of energy use and effective illumination.

It is anticipated that typically the optional side light or alley light arrangement 15 and optional takedown arrangement 13 will include LED units configured to generate white light, i.e. broad color band, light. This will facilitate the use of these lights as spotter lights for the occupants of the vehicle.

Typically, LED units within the pods 5 will be selected in accord with a variety of desired effects. For example, chips can be used for the LED units that generate more than one color, as selected form the key pad or as pre-programmed. Typically at least one of four colors (red, blue, amber and white) will be used.

In some instances, the user of the assembly 1 (for example a police officer) may wish selected light pods to be able to project white light, whereas others would select either red or blue, to create highly visible light effects. The control arrangement and LED units can be managed, to accommodate this.

In many instances, the dome 37 will be selected to be clear. However, light effects can be modified or enhanced, by providing portion of the dome 37 color. For example, if a dome 37 is provided with a red side 40, in association with a red LED, a strongly enhanced red effect can be provided.

D. LED Units

Typically, relatively high power LED units will be selected, for the individual units 51. By high energy in this context, it is noted that each LED unit will provided 18-100 lumens of light, although alternatives are possible. It is expected that as more powerful LED's are developed, they may be preferred.

Compare this for example with the operation of a rotating reflector light pod using halogen light. Assume for example a halogen light capable of about 100 watts of energy. When filtered to provide an amber color effect, approximately 30% of the light energy is removed (i.e. wasted) from the projecting beam. When filtered to generate blue light, a 100-watt light bulb only projects about 10-watts of blue light. When filtered to reflect red light, a 100-watt halogen light generally provides 20 watts of red light.

With an LED arrangement, however, the LED chip can be selected to provide, at its full power of operation, generally only visible light of the selected color. Thus, a relative high energy color beam by comparison to a halogen light is provided with less wasted energy.

Further, when the assembly is as characterized herein, multiple LED light sources are directed in the reflector at any given time. This can provide for a relatively high power light beam, rotating from the vehicle. This light beam can be seen not only from any of a variety of 360° positions, as the light swings toward the viewer, but can be sufficiently intense so that the viewer can actually see the rotating beams in space. This makes the vehicle highly visible from any of a wide variety of vantage points a substantial ways away from the vehicle.

VI. General Observations and Characteristics

In general accord with the principles, techniques, features and concepts described herein, a warning light assembly is provided comprising a moveable reflector light pod array. The moveable reflector light pod array generally comprises a first plurality of moveable reflector light pods; each moveable reflector light pod comprising a selectively moveably reflector arrangement and a first plurality of LED units configured and orientated to direct light against a selectively moveable reflector arrangement, for projection outwardly from the light pod.

Typically, the first plurality of moveable reflector light pods is configured in the moveable reflector light pod array to provide at least a first side viewable group of at least two (2), typically at least three (3), and often at least four (4) light pods; an opposite second side viewable group of at least two (2), typically at least three (3) and often at least four (4) light pods; a front viewable group of at least three (3), typically at least five (5) and often at least seven (7) light pods; and a rear viewable group of at least three (3), typically at least five (5), and often at least seven (7) light pods. There is no requirement that the same light pod cannot be in more than one of the groups, as discussed above.

In a typical example described, each moveable reflector light pod and the first plurality light pods includes a selectively moveable reflector arrangement configured to selectively rotate or oscillate (and typically rotate 360°) about a pod vertical axis. The arrangement can be configured so that rate of rotation can be varied from various selected rotation speeds, for example from within the range of 2-200 rpm, inclusive, if desired.

In accord with the general principles described herein, in an example arrangement, each moveable reflector light pod in the first plurality of light pods includes an array of LED units positioned to simultaneously, selectively, direct light from at least six (6), typically at least seven (7) and in some instance eight (8) LED units against an associated moveable reflector arrangement in the same light pod, in any and all rotational positions of the moveable reflector arrangement within a 360° rotation.

In a particular warning light assembly described herein, each moveable reflector light pod in the first plurality of moveable reflector light pods includes an associated reflector arrangement having a reflector exterior and a reflector interior. With such assemblies, typically the first plurality of LED units in each moveable reflector light pod in the first plurality of moveable reflector light pods, includes (for any given position to the associated reflector arrangement) a plurality of LED units directed at the reflector exterior for then reflection outwardly from the light pods; and, a plurality of LED units directed at the reflector interior, for then reflection outwardly from the light pod unit; in each instance the reflector interior and exterior being configured to direct light thereagainst in a reflector projection direction (i.e. light beam or light cast direction) around a pod vertical axis. Typically, the unit is configured so that at least four (4) LED units and typically at least six (6) LED units and often at least eight (8) LED units are directed at the exterior; and, typically at least two (2) and often at least four (4) and preferably at least five (5) units are directed at the interior in each possible rotational position of the moveable reflector, around a vertical axis. Of course, which particular ones of the LED units are directed at the reflector and where they are directed, can vary on the rotational orientation.

Although alternatives are possible, in an example assembly depicted, the moveable reflector arrangement is configured so that at any one of a plurality of selected positions around a vertical pod axis, at least one LED unit (and in the example depicted, at least two LED units) is oriented to direct light upwardly past the moveable reflector arrangement, to project outwardly from the pod in an upward direction. This is provided, in an example depicted, by providing, in the moveable reflector arrangement, a vertical light aperture arrangement as described.

In an assembly depicted, the moveable reflector light pods are oriented in a forward directed V-pattern when viewed from above. Typically, at least five (5) reflector light pods are positioned in a V-pattern, and in the example depicted at least seven (7) are depicted in the forward directed V-pattern when viewed from above.

In an example assembly depicted, an optional, straight, (typically multiple LED units) non-moveable reflector light arrangement is directed rearwardly. An example such light arrangement is described which is a rear arrow light bar.

In an example assembly described herein, an optional forwardly directed, non-moveable reflector (typically LED) takedown light arrangement is described. In an example described, the takedown light arrangement comprises two forwardly directed light units, one on each side of the central axis.

A warning light assembly is described which includes an optional side light arrangement, in the example depicted having: a first laterally directed non-movable reflector (typically LED) side light directed from one side; and, second, laterally directed, non-movable reflector (typically LED) side light directed from an opposite side. Each of the side lights in the example depicted, is angled to also direct slightly forward.

An assembly is described which includes a frame base having a plurality of pod mounting apertures therein, one moveable reflector light pod being mounted in each of the pod mounting apertures.

An example preferred dome for a light pod arrangement is described. Selected features are described for an example preferred light dome, although alternatives are possible.

Features are described relating to accomplishing a variety of color effects. These can be accomplished through use of various colored LED units, and by various coloring of the dome or other optics within the system.

Methods of operation, use and assembly are described. A typical method of assembly includes providing a warning light assembly by conducting the step of positioning a plurality of moveable reflector light pods as characterized above, in an array in a frame for positioning on a motor vehicle. The array may be generally as characterized above. Also, a method of providing a warning light effect is generally described, which includes a step of selectively actuating rotating light pods in a light pod array comprising a plurality of moveable reflector light pods, generally as characterized above.

There is no specific requirement, again, that any component, assembly, feature, principle or technique involve all of the features characterized herein, in order to obtain some benefit in accord with present disclosure.

What is claimed is:

1. A warning light assembly comprising:
   (a) a moveable reflector light pod array comprising:
       (i) a first plurality of moveable reflector light pods; each moveable reflector light pod comprising: a selectively moveable reflector arrangement; and, a first plurality of LED units configured and oriented to direct light against the selectively moveable reflector arrangement;
       (ii) the first plurality of moveable reflector light pods being configured in the moveable reflector light pod array to provide, at least:
           (A) a first side-viewable group of at least two reflector light pods;
           (B) an, opposite, second, side viewable group of at least two reflector light pods;
           (C) a front viewable group of at least three reflector light pods; and,
           (D) a rear viewable group of at least three reflector light pods;
   (b) wherein each moveable reflector light pod in the first plurality of moveable reflector light pods includes on associated reflector arrangement having a reflector exterior and a reflector interior; and,
   (c) wherein the first plurality of LED units, in each moveable reflector light pod in the first plurality of moveable reflector light pods, includes, for any given position of the associated reflector arrangement:
       (i) a plurality of LED units directed at the reflector exterior of an associated moving reflector arrangement; and,
       (ii) a plurality of LED units directed at the reflector interior of the associated moving reflector;
       (ii) each of the reflector interior and reflector exterior being configured to reflect light directed thereagainst from associated LED units in a selected reflector projection direction for each possible selected reflector projection direction around a pod vertical axis.

2. A warning light assembly according to claim 1 wherein:
   (a) the first plurality moveable reflector light pods are configured to provide at least:
       (i) a first side viewable group of at least three reflector light pods;
       (ii) an, opposite, second side viewable group of least three reflector light pods;
       (iii) a front viewable group of at least five reflector light pods; and, (iv) a rear viewable group of at least five reflector light pods.

3. A warning light assembly according to claim 1 wherein:
(a) the first plurality moveable reflector light pods are configured to provide at least:
(i) a first side viewable group of at least four reflector light pods;
(ii) an, opposite, second side viewable group after least four light pods;
(iii) a front viewable group of at least seven reflector light pods; and,
(iv) a rear viewable group of at least seven reflector light pods.

4. A warning light assembly according to claim 1 wherein:
(a) the first plurality of moveable reflector light pods is configured to provide
(i) a first side viewable group of four reflector light pods;
(ii) an, opposite, second side viewable group four reflector light pods;
(iii) a front viewable group of seven reflector light pods; and,
(iv) a rear viewable group of seven reflector light pods.

5. A warning light assembly according to claim 1 wherein:
(a) each moveable reflector light pod in the first plurality of reflector light pods includes a selectively moveable reflector arrangement configured to selectively rotate 360° about a pod vertical axis.

6. A warning light assembly according to claim 1 wherein:
(a) each moveable reflector light pod in the first plurality of reflector light pods includes an array of LED units positioned to simultaneously, selectively, direct light from at least eight (8) LED units against an associated moveable reflector arrangement in the same light pod, at any and all rotational positions of the moveable reflector arrangement within a 360° rotation.

7. A warning light assembly according to claim 1 wherein:
(a) each moveable reflector light pod in the first plurality of reflector light pods includes an array of LED units positioned to simultaneously, selectively, direct light from at least ten (10) LED units against an associated moveable reflector arrangement in the same light pod, at any and all possible rotational positions of the moveable reflector arrangement within a 360° rotation.

8. A warning light assembly according to claim 1 wherein:
(a) the plurality of LED units directed at the reflector exterior of each moveable reflector light pod comprises at least six LED units; and,
(b) the plurality of LED units directed the reflector interior of each moveable reflector light pod comprises at least three LED units.

9. A warning light assembly according to claim 8 wherein:
(a) the plurality of LED units directed at the reflector exterior of each moveable reflector light pod comprises at least eight units.

10. A warning light assembly according to claim 8 wherein:
(a) the second plurality of LED units directed at the reflector exterior of each moveable reflector light pod comprises at least four LED units.

11. A warning light assembly according to claim 1 wherein:
(a) the moveable reflector arrangement is configured so that at any one of a plurality of selected positions thereof at least one LED unit of the first plurality of LED units is oriented to direct light upwardly past the moveable reflector arrangement.

12. A warning light assembly according to claim 11 wherein:
(a) the moveable reflector arrangement is configured so that at any one of a plurality of selected positions thereof at least two LED-unit of the first plurality of LED units is oriented to direct light upwardly past the moveable reflector arrangement.

13. A warning light assembly according to claim 1 comprising:
(a) at least five moveable reflector light pods oriented in a forward directed V-pattern when viewed from above.

14. A warning light assembly according to claim 1 comprising:
(a) at least seven moving reflector light pods oriented in a forward directed V-pattern when viewed from above.

15. A warning light assembly according to claim 1 comprising:
(a) a frame base having a plurality of pod mounting apertures therein; and,
(b) one moveable reflector light pod mounted in each one of the pod mounting apertures.

16. A warning light assembly according to claim 1 wherein:
(a) at least one of the first plurality of moving reflector light pods includes a light transmission dome with a non-colored top for transmission therethrough of vertically directed light.

17. A warning light assembly according to claim 16 wherein:
(a) each one of the first plurality of moving reflector light pods includes a light transmission dome with a non-colored top for transmission therethrough of vertically directed light.

18. A warning light assembly comprising:
(a) a moveable reflector light pod array comprising:
(i) a first plurality of moveable reflector light pods; each moveable reflector light pod comprising: a selectively moveable reflector arrangement; and, a first plurality of LED units configured and oriented to direct light against the selectively moveable reflector arrangement;
(ii) the first plurality of moveable reflector light pods being configured in the moveable reflector light pod array to provide, at least:
(A) a first side-viewable group of at least two reflector light pods;
(B) an, opposite, second, side viewable group of at least two reflector light pods;
(C) a front viewable group of at least three reflector light pods; and,
(D) a rear viewable group of at least three reflector light pods;
(b) wherein the moveable reflector arrangement is configured so that at any one of a plurality of selected positions thereof at least one LED unit of the first plurality of LED units is oriented to direct light upwardly past the moveable reflector arrangement;
(b) wherein the at least one moveable reflector light pod includes a moveable reflector arrangement that includes a vertical light aperture arrangement therein; and,
(c) wherein the moveable reflector arrangement is configured to rotate around a vertical pod axis and to move the vertical light aperture arrangement over each one of the LED units during a single 360° rotation.

19. A warning light assembly according to claim 18 wherein:

(a) the vertical light aperture arrangement includes two, rotationally-spaced, aperture members; and,
(b) the moveable reflector arrangement is configured to rotate around a vertical pod axis and to move each aperture in the vertical light aperture arrangement over each one of the LED units during a 360° rotation.

* * * * *